(12) United States Patent
Ino et al.

(10) Patent No.: US 12,452,534 B2
(45) Date of Patent: Oct. 21, 2025

(54) CONTROL APPARATUS, LENS APPARATUS, IMAGE PICKUP APPARATUS, IMAGE PICKUP SYSTEM, CONTROL METHOD, AND A NON-TRANSITORY COMPUTER-READABLE STORAGE MEDIUM

(71) Applicant: CANON KABUSHIKI KAISHA, Tokyo (JP)

(72) Inventors: Tomohiro Ino, Tochigi (JP); Satoshi Maetaki, Tochigi (JP); Yuki Shinzato, Saitama (JP); Tomoki Tokita, Tochigi (JP); Junichi Saito, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 135 days.

(21) Appl. No.: 18/148,210

(22) Filed: Dec. 29, 2022

(65) Prior Publication Data

US 2023/0217112 A1  Jul. 6, 2023

(30) Foreign Application Priority Data

Jan. 1, 2022 (JP) .................................. 2022-000017
Nov. 24, 2022 (JP) .................................. 2022-187009

(51) Int. Cl.
H04N 23/68 (2023.01)

(52) U.S. Cl.
CPC ....... *H04N 23/687* (2023.01); *H04N 23/6811* (2023.01)

(58) Field of Classification Search
CPC ............. H04N 23/687; H04N 23/6811; H04N 23/663; H04N 23/6812; H04N 23/685
See application file for complete search history.

(56) References Cited

U.S. PATENT DOCUMENTS

| | | | | |
|---|---|---|---|---|
| 2015/0281581 | A1* | 10/2015 | Sakurai | H04N 23/6812 |
| | | | | 348/208.2 |
| 2020/0077024 | A1* | 3/2020 | Sudo | H04N 23/663 |
| 2020/0162674 | A1 | 5/2020 | Ito | |
| 2020/0260010 | A1 | 8/2020 | Nakajima et al. | |
| 2021/0360159 | A1* | 11/2021 | Shingu | H04N 23/683 |

FOREIGN PATENT DOCUMENTS

| | | |
|---|---|---|
| JP | 6410431 B2 | 10/2018 |
| JP | 2018173632 A * | 11/2018 |

* cited by examiner

*Primary Examiner* — Twyler L Haskins
*Assistant Examiner* — Surafel Yilmakassaye
(74) *Attorney, Agent, or Firm* — Canon U.S.A., Inc. IP Division

(57) ABSTRACT

A control apparatus, which controls an image pickup system including a first apparatus that is one of an image pickup apparatus and a lens apparatus and a second apparatus that is the other, includes an acquisition unit configured to acquire first information on a first image stabilizing remaining amount at an off-axis image height according to correction by a first image shake corrector provided in the first apparatus and second information on a second image stabilizing remaining amount at the off-axis image height according to correction by a second image shake corrector provided in the second apparatus, and a control unit configured to control at least one of the first image shake corrector and the second image shake corrector on the basis of correction ratios of the first image shake corrector and the second image shake corrector determined using the first information and the second information.

16 Claims, 17 Drawing Sheets

COOPERATIVE CONTROL
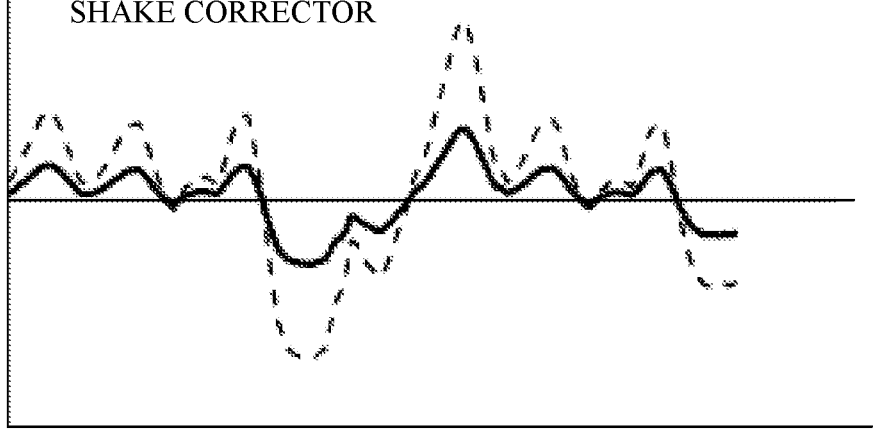
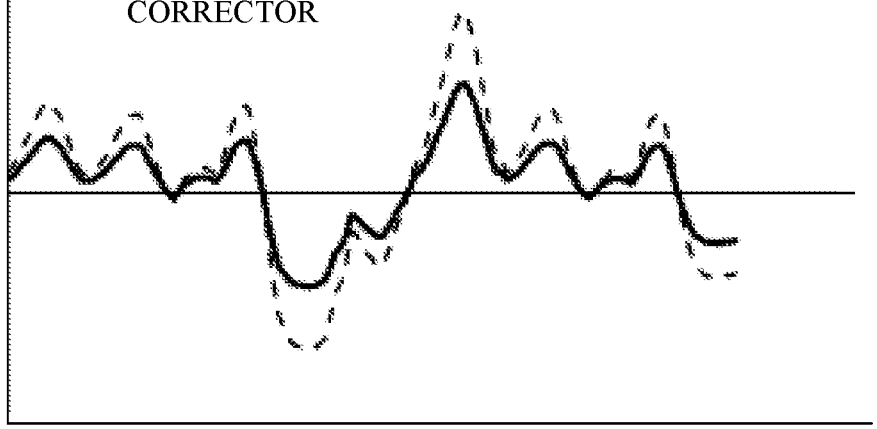
FIG. 8

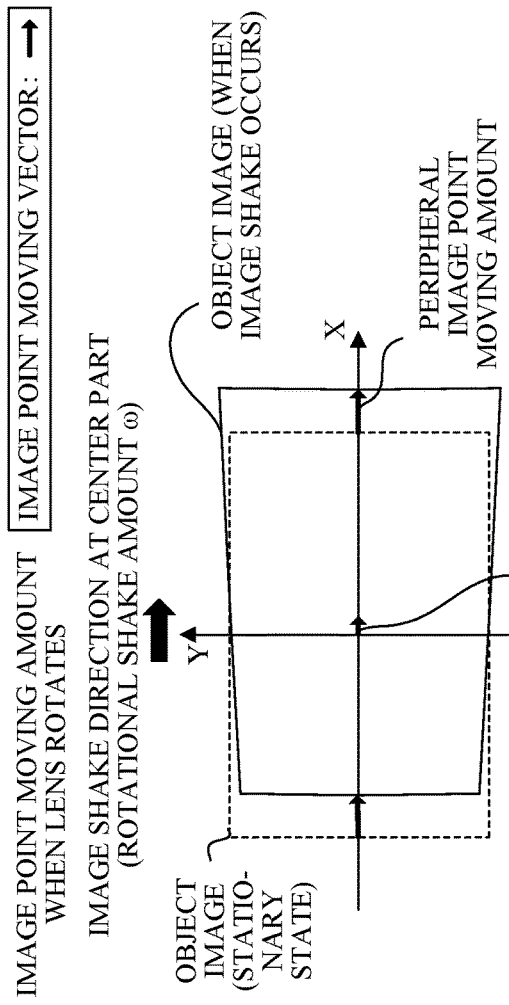
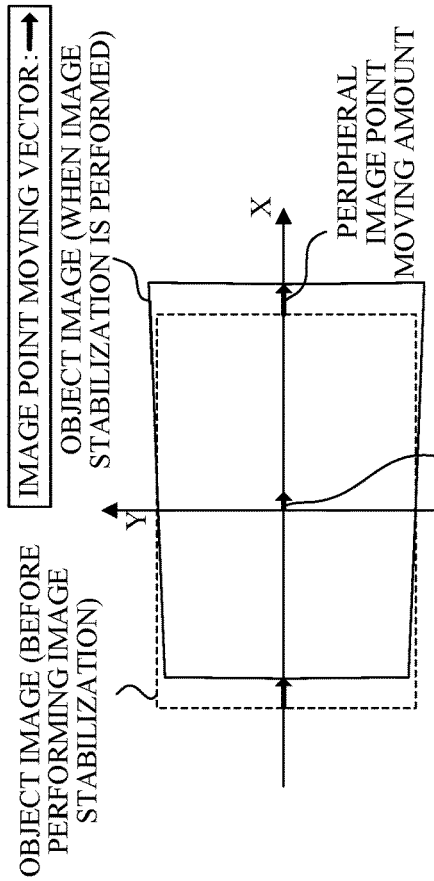
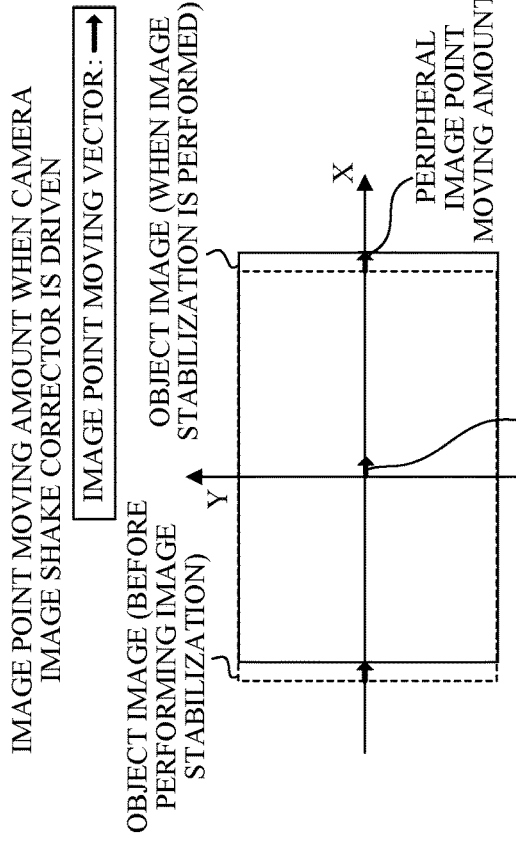
FIG. 12A  CENTRAL IMAGE POINT MOVING AMOUNT
FIG. 12B  CENTRAL IMAGE POINT MOVING AMOUNT
FIG. 12C  CENTRAL IMAGE POINT MOVING AMOUNT

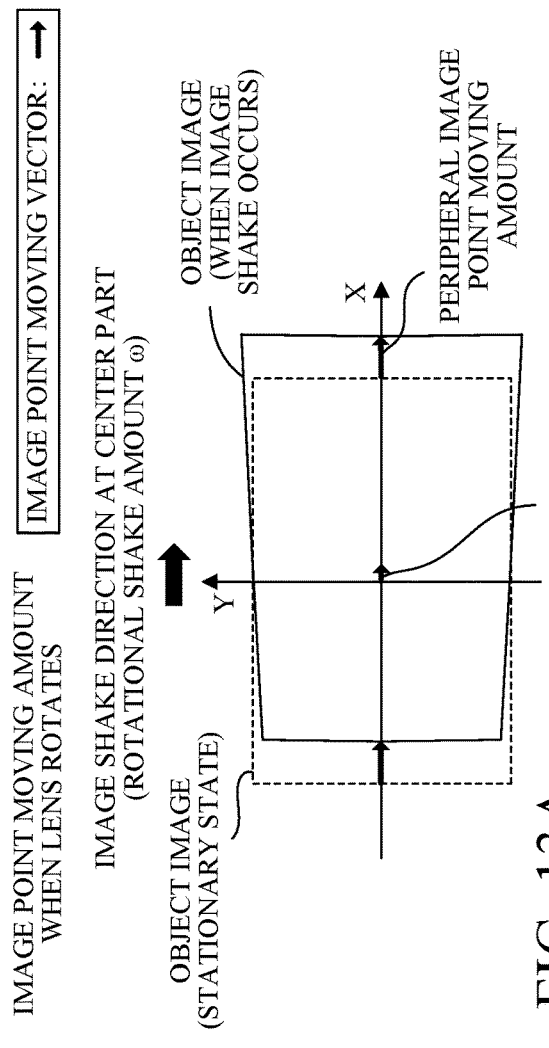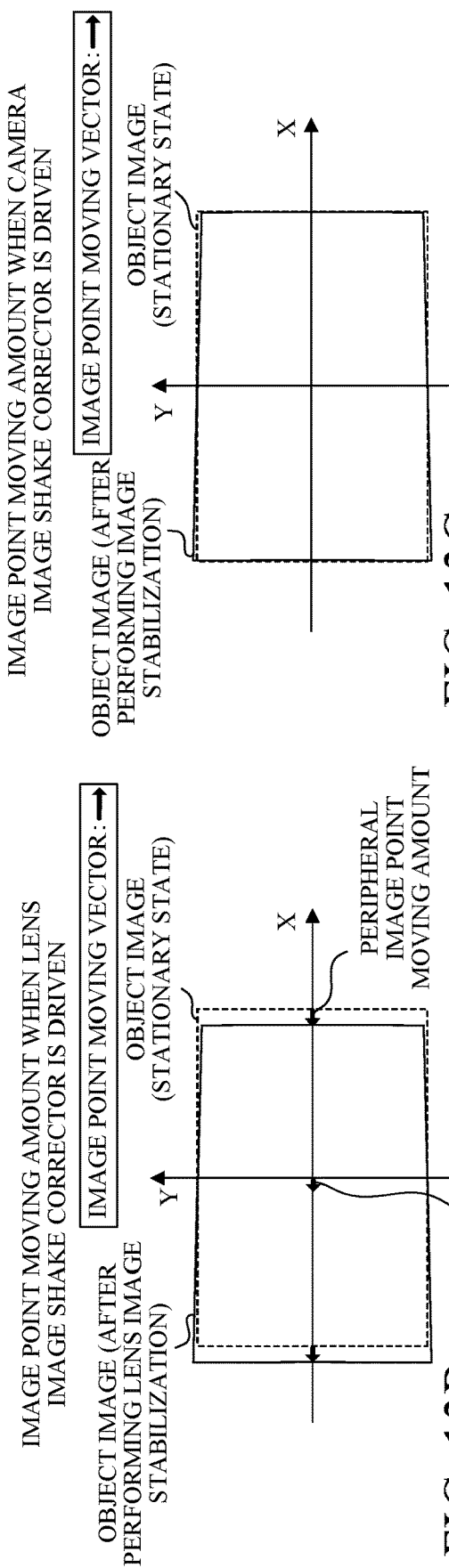
FIG. 13A
FIG. 13B
FIG. 13C

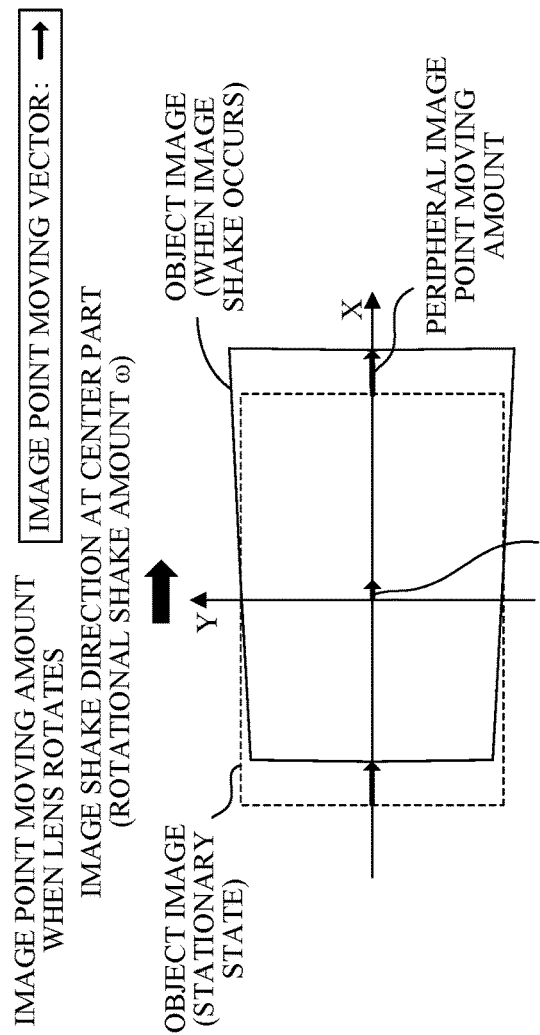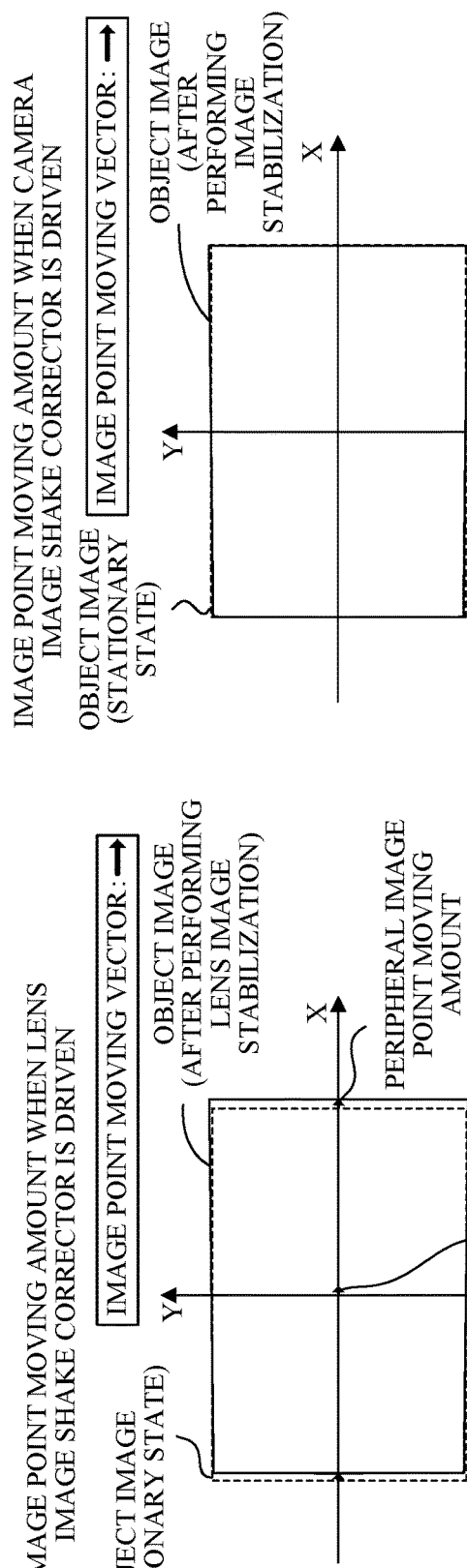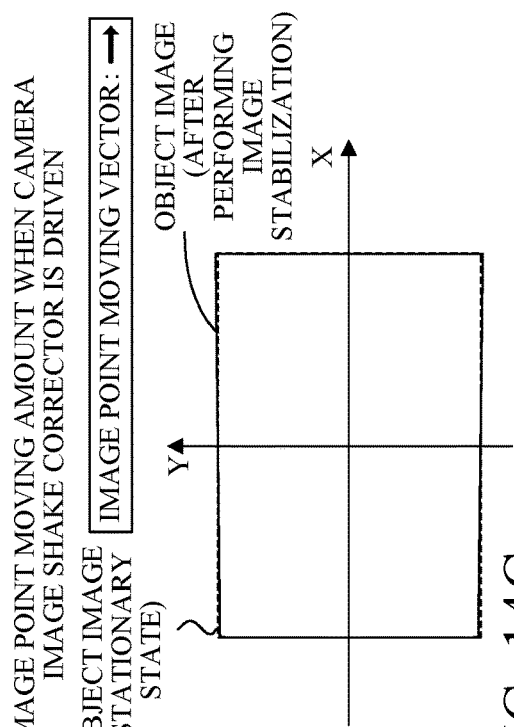

PRIOR ART

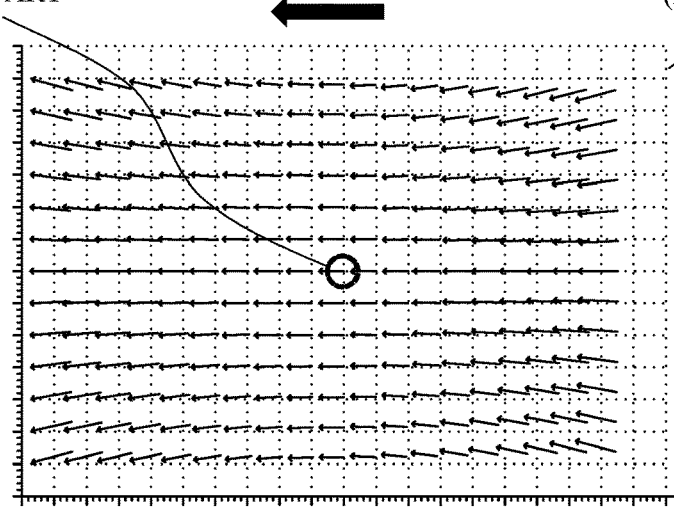

IMAGE CENTER PART

IMAGE SHAKE DIRECTION AT CENTER PART

OBJECT IMAGE (ROTATIONAL SHAKE OCCURS)

STARTING POINT OF ARROW: IMAGE POINT POSITION OF STATIONARY OBJECT IMAGE

END POINT OF ARROW: IMAGE POINT POSITION WHEN ROTATIONAL SHAKE OCCURS

FIG. 16A

PRIOR ART

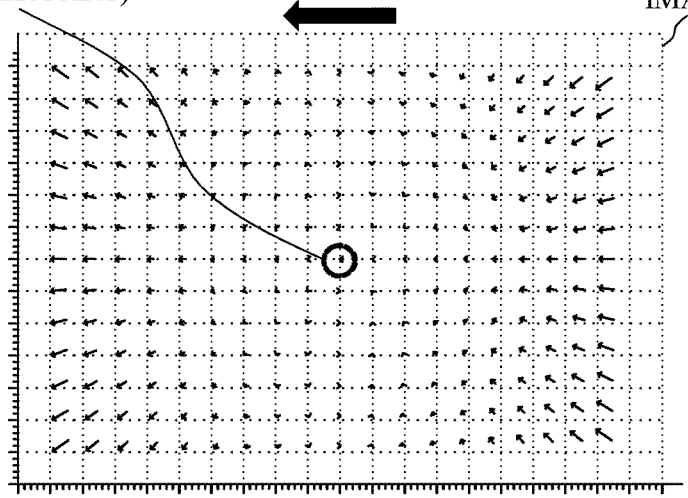

IMAGE STABILIZATION POSITION (IMAGE CENTER PART)

IMAGE SHAKE DIRECTION AT CENTER PART

OBJECT IMAGE (IMAGE STABILIZATION AT CENTRAL PART IN IMAGE IS PERFORMED

STARTING POINT OF ARROW: IMAGE POINT POSITION OF STATIONARY OBJECT IMAGE

END POINT OF ARROW: IMAGE POINT POSITION AFTER IMAGE STABILIZATION WHEN ROTATIONAL SHAKE OCCURS

FIG. 16B

CONTROL APPARATUS, LENS APPARATUS, IMAGE PICKUP APPARATUS, IMAGE PICKUP SYSTEM, CONTROL METHOD, AND A NON-TRANSITORY COMPUTER-READABLE STORAGE MEDIUM

BACKGROUND

Field of the Disclosure

The disclosure relates to a control apparatus, a lens apparatus, an image pickup apparatus, an image pickup system, a control method, and a non-transitory computer-readable storage medium.

Description of the Related Art

An image pickup apparatus to perform hybrid image stabilization combining image pickup element image stabilization performing image stabilization by shifting an image pickup element and image stabilization in lens performing image stabilization by shifting a part of a lens group in an image pickup optical system with respect to an optical axis has been proposed.

Japanese Patent No. 6410431 discloses a camera system that expands a range of image stabilization for the camera system as a whole by appropriately setting correction ratios of image pickup element image stabilization and image stabilization in lens.

When an image pickup optical system adopting a central projection method is used, an image point moving amount generated during camera shake correction differs between a center part and a peripheral part in an image. FIG. 16A illustrates a magnitude and a direction of an image point moving amount at each image point on an object image when image shake occurs at a center part in a –X direction due to camera shake (rotational shake). FIG. 16B illustrates a magnitude and a direction of a remaining amount of image stabilization at each image point on the object image when the image shake generated at the center part of FIG. 16A is corrected by the image pickup element image stabilization. As illustrated in FIG. 16A, the image point moving amount at a peripheral part is larger than the image point moving amount at the center part. Thus, as illustrated in FIG. 16B, the image shake at the center part is corrected, but an influence of the image shake at the peripheral part remains, and the image point remains largely moved.

Japanese Patent No. 6410431 does not disclose a configuration for simultaneously correcting image shake generated at the center part and the peripheral part in the image.

SUMMARY

Embodiments of the disclosure provide a control apparatus, a lens apparatus, an image pickup apparatus, an image pickup system, a control method, and a non-transitory computer-readable storage medium capable of suppressing an influence of an image shake remaining at a peripheral part in an image.

A control apparatus according to one aspect of embodiments of the disclosure controls an image pickup system including a first apparatus that is one of an image pickup apparatus and a lens apparatus to be attached to the image pickup apparatus and a second apparatus that is the other of the image pickup apparatus and the lens apparatus. The control apparatus includes an acquisition unit configured to acquire first information on a first image stabilizing remaining amount at an off-axis image height according to correction by a first image shake corrector provided in the first apparatus and second information on a second image stabilizing remaining amount at the off-axis image height according to correction by a second image shake corrector provided in the second apparatus, and a control unit configured to control at least one of the first image shake corrector and the second image shake corrector on the basis of correction ratios of the first image shake corrector and the second image shake corrector determined using the first information and the second information.

A control apparatus according to one aspect of embodiments of the disclosure includes one or more processors configured to control an image pickup system including a first apparatus that is one of an image pickup apparatus and a lens apparatus to be attached to the image pickup apparatus and a second apparatus that is the other of the image pickup apparatus and the lens apparatus. The control apparatus moves a first image shake corrector in a direction to perform image stabilization and moves a second image shake corrector in a direction opposite to the direction to perform image stabilization.

A lens apparatus, an image pickup apparatus, and an image pickup system each including the above control apparatus also constitute other aspects of embodiments of the disclosure.

A control method according to one aspect of embodiments of the disclosure is a method to control an image pickup system including a first apparatus that is one of an image pickup apparatus and a lens apparatus to be attached to the image pickup apparatus and a second apparatus that is the other of the image pickup apparatus and the lens apparatus. The control method includes a step of acquiring first information on a first image stabilizing remaining amount at an off-axis image height in an image according to correction by a first image shake corrector provided in the first apparatus and second information on a second image stabilizing remaining amount at the off-axis image height according to correction by a second image shake corrector provided in the second apparatus, a step of controlling at least one of the first image shake corrector and the second image shake corrector on the basis of correction ratios of the first image shake corrector and the second image shake corrector determined using the first information and the second information.

A control method according to one aspect of embodiments of the disclosure is a method to control an image pickup system including a first apparatus that is one of an image pickup apparatus and a lens apparatus to be attached to the image pickup apparatus and a second apparatus that is the other of the image pickup apparatus and the lens apparatus. The control method includes a step of moving a first image shake corrector in a direction to perform image stabilization and a step of moving a second image shake corrector in a direction opposite to the direction to perform image stabilization.

A non-transitory computer-readable storage medium according to one aspect of embodiments of the disclosure stores a computer program that causes a computer to execute the control method.

Further features of the present disclosure will become apparent from the following description of exemplary embodiments with reference to the attached drawings.

BRIEF DESCRIPTION OF THE DRAWINGS

FIG. 8 is an explanatory diagram of the cooperative control according to the second embodiment.

FIG. 12A illustrates an image point moving amount of an object image due to image shake when a digital camera is rotated by w in a x direction. FIG. 12B illustrates an image point moving amount of the object image when a lens image shake corrector is driven. FIG. 12C illustrates an image point moving amount of the object image when a camera image shake corrector is driven.

FIGS. 13A to 13C are explanatory diagrams of a concept according to the fifth embodiment.

FIGS. 14A to 14C are explanatory diagrams of a concept according to the fifth embodiment.

FIG. 16A is an explanatory diagram of an image point moving amount at each image point on an object image when image shake occurs at a center part in an image in a −X direction. FIG. 16B is an explanatory diagram of a remaining amount of image stabilization at each image point on the object image when the image shake generated at the center part of FIG. 16A is corrected by the image pickup element image stabilization.

DESCRIPTION OF THE EMBODIMENTS

Figure 1A:
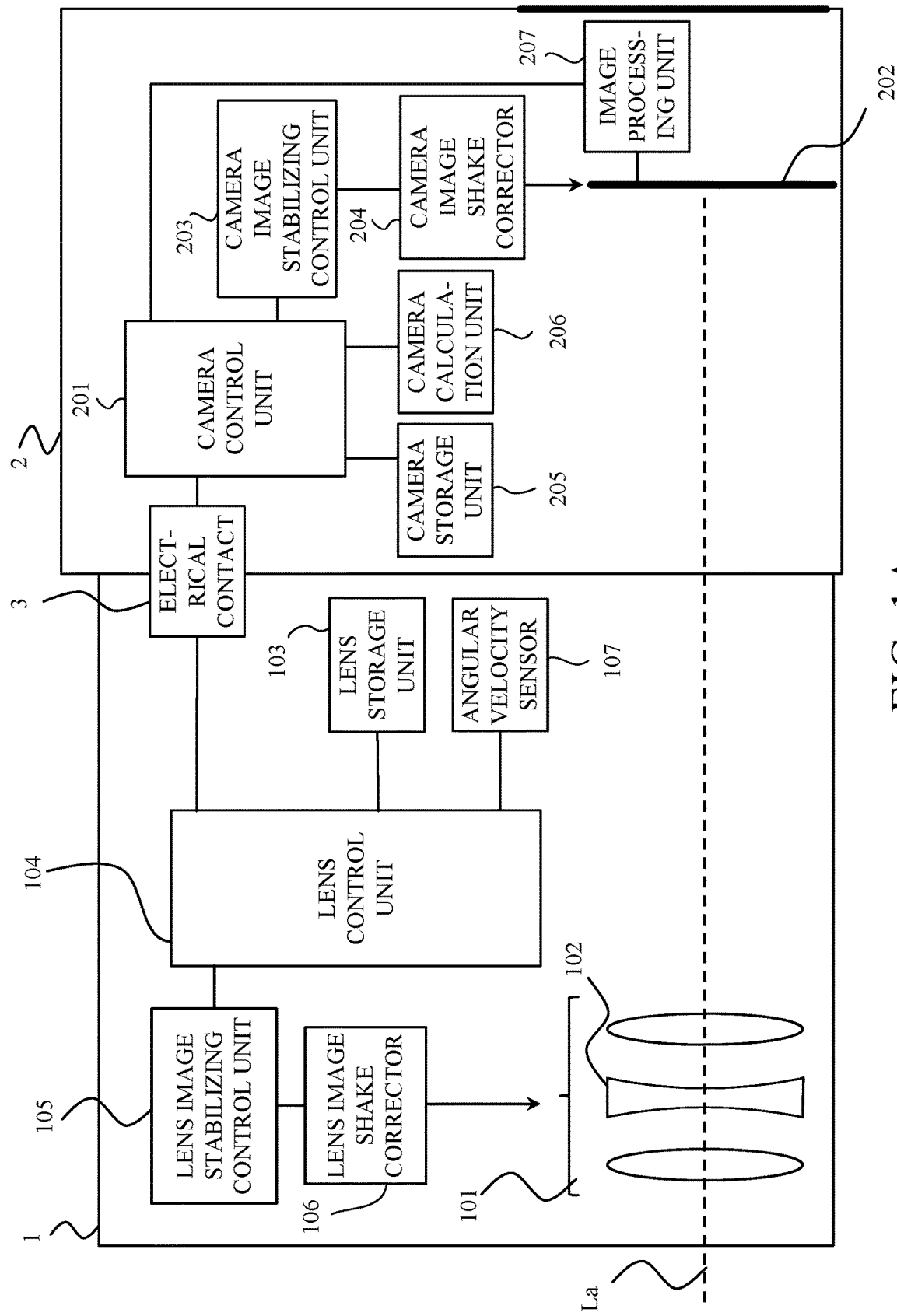
FIG. 1A is a configuration diagram illustrating a digital camera, which is an example of a camera system according to an embodiment of the disclosure.

Referring now to the accompanying drawings, a detailed description will be given of embodiments according to the disclosure. Corresponding elements in respective figures will be designated by the same reference numerals, and a duplicate description thereof will be omitted.

FIG. 1A is a configuration diagram illustrating a digital camera, which is an example of a camera system (image pickup system) according to an embodiment of this disclosure. The digital camera is an interchangeable lens type camera and includes an interchangeable lens (lens apparatus) 1 and a camera body (image pickup apparatus) 2. The interchangeable lens 1 is detachably and communicatively attached to the camera body 2. The interchangeable lens 1 and the camera body 2 are electrically connected by an electrical contact 3, and communicate information and share power via the electrical contact 3.

The interchangeable lens 1 includes an image pickup optical system 101 having a plurality of optical elements including an image stabilizing optical system 102, a lens storage unit 103, a lens control unit 104, a lens image stabilizing control unit 105, a lens image shake corrector 106, and an angular velocity sensor 107.

The camera body 2 includes a camera control unit 201, an image pickup element 202, a camera image stabilizing control unit 203, a camera image shake corrector 204, a camera storage unit 205, a camera calculation unit 206, and an image processing unit 207.

A ray from an image pickup angle of view centered on an optical axis La of the image pickup optical system 101 passes through the image pickup optical system 101 and is formed as an object image on the image pickup element 202. The object image is photoelectrically converted by a photoelectric conversion unit (not illustrated) of the image pickup element 202 and transmitted to the image processing unit 207 as an electric signal. The image processing unit 207 converts the electrical signal from the image pickup element 202 into image data in an image file format by developing process and gamma process. The image data is stored in a nonvolatile memory (not illustrated) by the camera control unit 201.

The image pickup element 202 can be moved in a direction including a component perpendicular to the optical axis La by the camera image shake corrector 204. The camera image shake corrector 204 includes a supporting member that supports the image pickup element 202 and an actuator that moves the image pickup element 202 in the direction including the component perpendicular to the optical axis La. The camera image stabilizing control unit 203 performs camera side image stabilization by controlling the camera image shake corrector 204 under control of the camera control unit 201.

The image stabilizing optical system 102 can be moved in the direction including the component perpendicular to the optical axis La by the lens image stabilizing control unit 105 and the lens image shake corrector 106. The lens image shake corrector 106 includes a supporting member that supports the image stabilizing optical system 102 and an actuator that moves the image stabilizing optical system 102 in the direction including the component perpendicular to the optical axis La. The lens image stabilizing control unit 105 performs lens side image stabilization by controlling the lens image shake corrector 106 under control of the lens control unit 104.

The camera control unit 201 and the lens control unit 104 communicate with each other via the electrical contacts 3 and perform driving control to reduce unnecessary vibrations applied to the digital camera using the camera image shake corrector 204 and the lens image shake corrector 106.

In this embodiment, the camera control unit 201 controls the lens image stabilizing control unit 105 and the lens image shake corrector 106 via the lens control unit 104 to control image stabilization of the entire digital camera, but the disclosure is not limited to this. The lens control unit 104 may control the camera image stabilizing control unit 203 and the camera image shake corrector 204 via the camera control unit 201 to control the image stabilization of the entire digital camera.

Figure 1B:
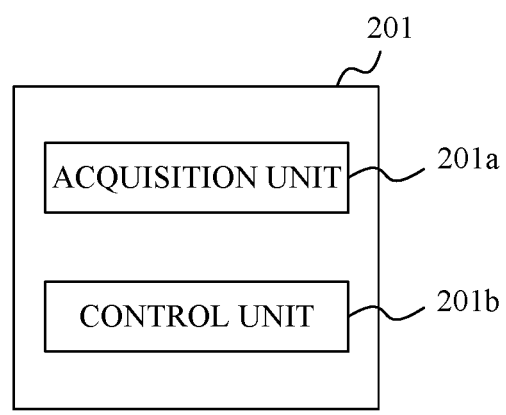
FIG. 1B is a configuration diagram of a camera control unit.

The camera control unit 201 also functions as a control apparatus including an acquisition unit 201a and a control unit 201b, as illustrated in FIG. 1B. The acquisition unit 201a acquires information on image stabilizing remaining amounts on a lens side and a camera side (difference between an image point moving amount before correction and the image point moving amount after correction). The control unit 201b determines correction ratios of the two image shake correctors (ratios for correcting the image point moving amount) using the information acquired by the acquisition unit 201a and corrects at least one of the two image shake correctors on the basis of the correction ratios. The lens control unit 104 may function as a control apparatus including an acquisition unit and a control unit. Additionally, a control apparatus including an acquisition unit and a control unit may be configured as an apparatus separate from the interchangeable lens 1 and the camera body 2.

The lens storage unit 103 stores a current focal length of the interchangeable lens 1, an image stabilizing angle that can be controlled by the lens image shake corrector 106, and an image stabilizing angle corresponding to a moving amount of the image stabilizing optical system 102, that is, a lens image stabilizing sensitivity information. The lens storage unit 103 also stores an image stabilizing angle corresponding to a moving amount of the image pickup element 202, that is, camera image stabilizing sensitivity information. The lens storage unit 103 also stores information (lens peripheral image stabilizing remaining information) on a remaining amount of image stabilization at a peripheral part in an image when the lens image shake corrector 106 corrects an image shake generated at a center part in the image by a predetermined angle. Further, the lens storage unit 103 stores information (camera peripheral image stabilizing remaining information) on a remaining amount of image stabilization at the peripheral part in the image when the camera image shake corrector 204 corrects the image shake generated at the center part in the image by a predetermined angle. The information stored in the lens storage unit 103 is referred to by the lens control unit 104 and the camera control unit 201.

The camera control unit 201 outputs a command on the driving control of the camera image shake corrector 204 to the camera image stabilizing control unit 203 on the basis of the information stored in the lens storage unit 103. For example, the camera control unit 201 calculates an image stabilizing angle that can be controlled by the camera image shake corrector 204 on the basis of the camera image stabilizing sensitivity information and determines drive ratios (correction ratios) of the two image shake correctors. Further, for example, the camera control unit 201 switches a method of determining the drive ratios of the two image shake correctors on the basis of the lens peripheral image stabilizing remaining information and the camera peripheral image stabilizing remaining information.

The lens control unit 104 performs driving control of various actuators through various control units (not illustrated) according to instructions given from the camera body 2. For example, the lens control unit 104 performs driving control of an unillustrated focus adjustment means and an unillustrated aperture means via an unillustrated focus adjustment control unit and an unillustrated aperture control unit according to focus detection information and photometry information of the object obtained by the image processing unit 207, and thus can adjust an imaging state of the object image and an aperture state.

Additionally, in this embodiment, the camera image shake corrector 204 performs the camera side image stabilization by driving the image pickup element 202, but the disclosure is not limited to this. The camera image shake corrector 204 may perform the camera side image stabilization by changing a segmentation position of the object image formed on the image pickup element 202.

First Embodiment

Image stabilization performed by a digital camera according to this embodiment determines driving amounts of two image shake correctors on the basis of the information stored in the lens storage unit 103 while the camera control unit 201 communicates with the lens control unit 104 via the electrical contact 3.

Figure 2:
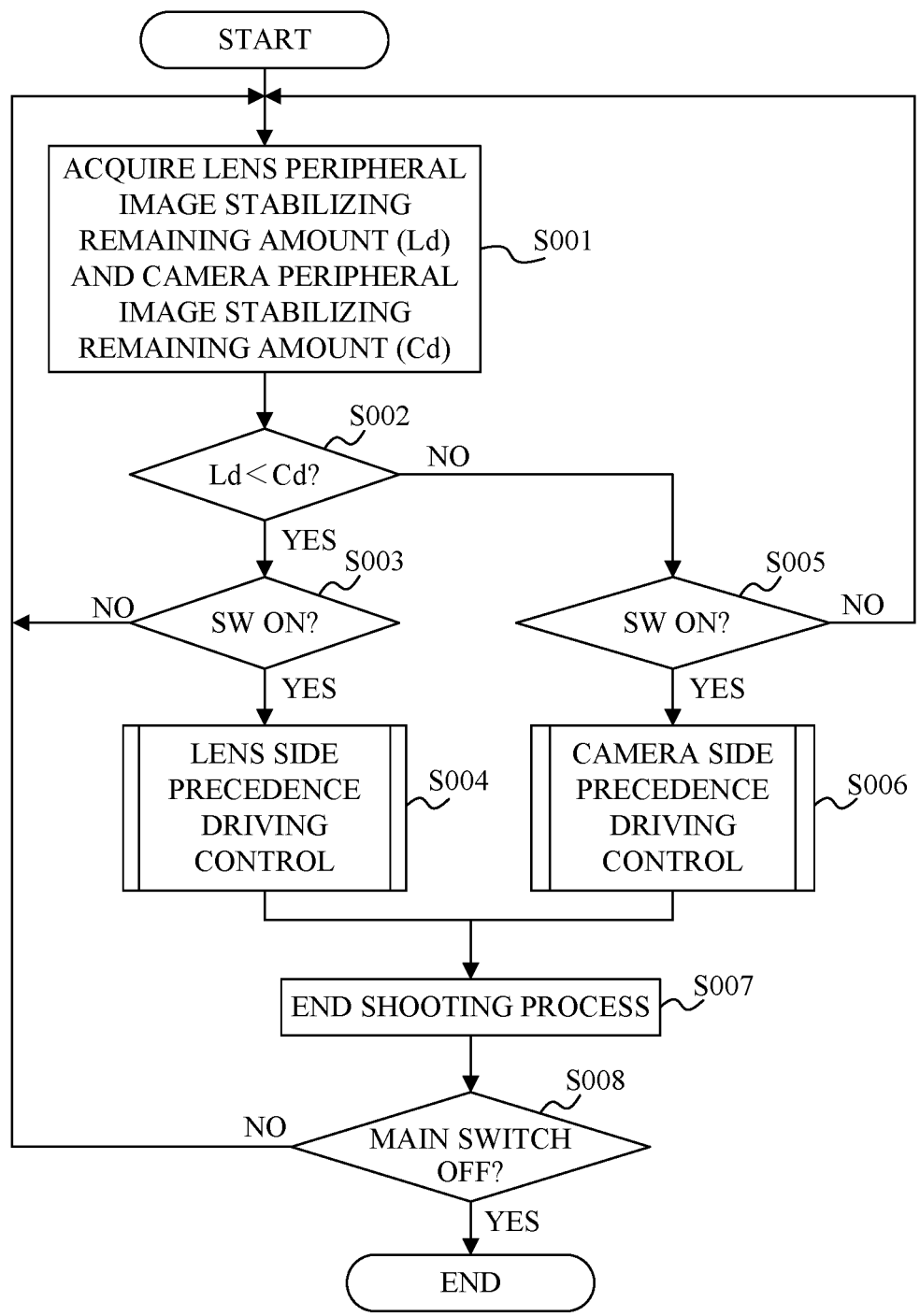
FIG. 2 is a flowchart illustrating image stabilization executed by the digital camera according to a first embodiment.
Figure 3:
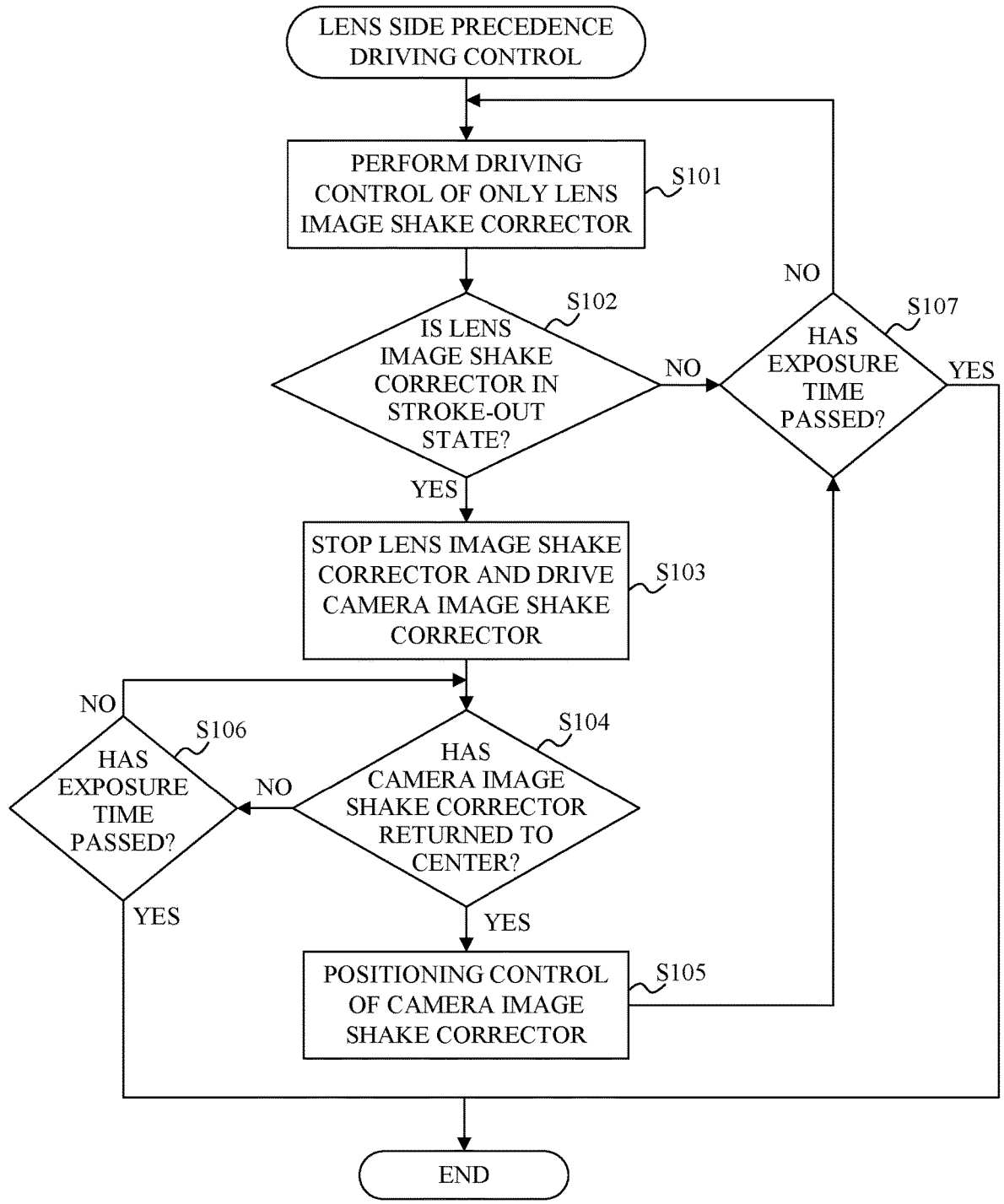
FIG. 3 is a flowchart illustrating lens side precedence driving control executed by the digital camera according to the first embodiment.
Figure 4:
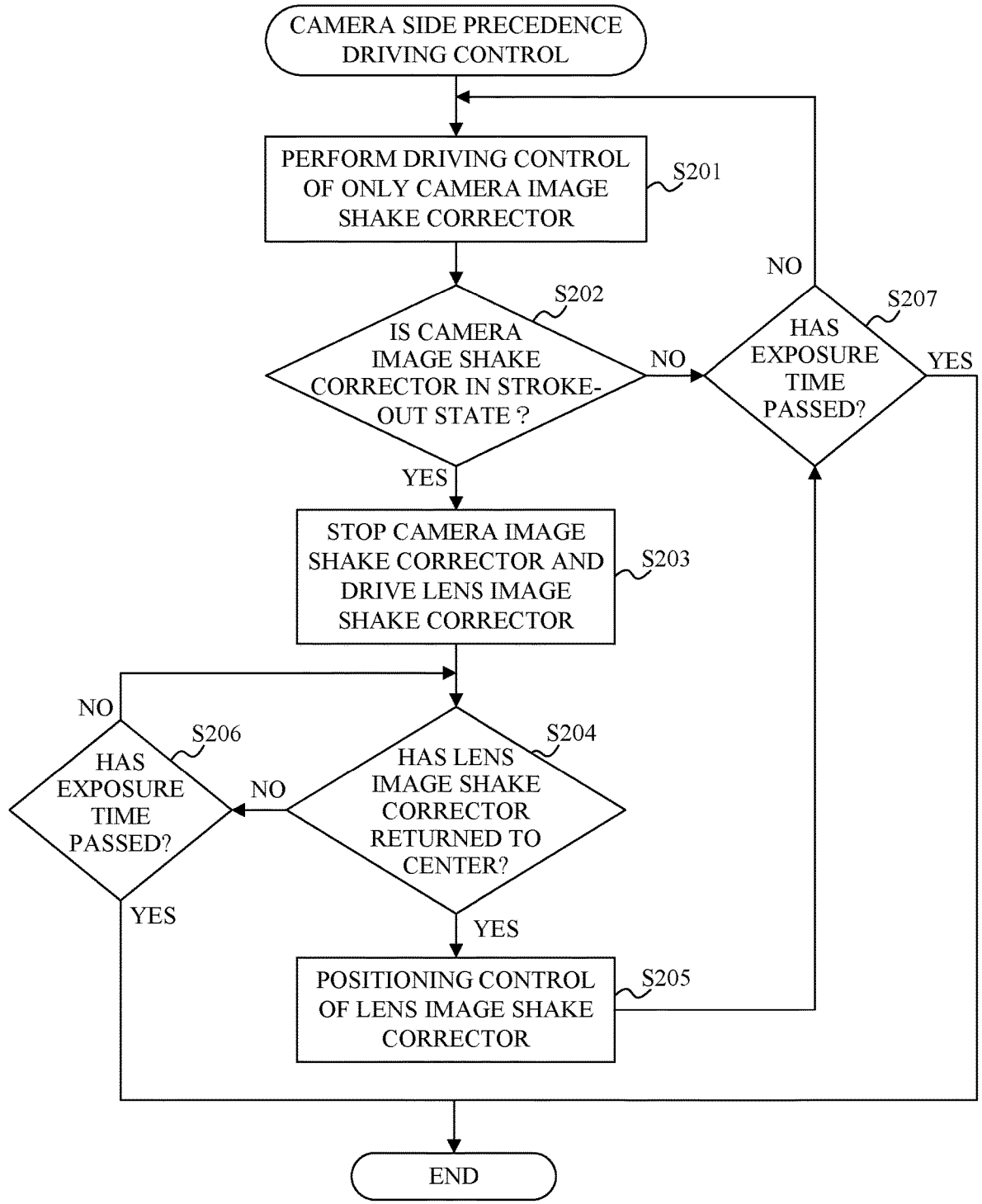
FIG. 4 is a flowchart illustrating camera side precedence driving control executed by the digital camera according to the first embodiment.

The image stabilization according to this embodiment includes an entire flow of the image stabilization in FIG. 2, a subroutine (FIG. 3) called "lens side precedence driving control (first driving mode)" in FIG. 2, and a subroutine (FIG. 4) called "camera side precedence driving control (second driving mode)" in FIG. 2. FIG. 2 is a flowchart illustrating the image stabilization executed by the digital camera according to this embodiment. FIG. 3 is a flowchart illustrating the lens side precedence driving control executed by the digital camera according to this embodiment. FIG. 4 is a flowchart illustrating the camera side precedence driving control executed by the digital camera according to this embodiment.

The entire flow of the image stabilization in FIG. 2 is started when the power of the digital camera is turned on or when a sleep state is restored.

In step S001, the camera control unit 201 acquires the lens peripheral image stabilizing remaining amount Ld and the camera peripheral image stabilizing remaining amount Cd stored in the lens storage unit 103 via the electrical contact 3 and the lens control unit 104.

As described above, the lens peripheral image stabilizing remaining amount Ld is the remaining amount of the image stabilization at the peripheral part in the image when the lens image shake corrector 106 corrects the image shake generated at the center part in the image by a predetermined angle, and is the remaining amount of the image stabilization at a predetermined image height in the image. The predetermined image height is an image height (off-axis image height) except for the image axis. The lens peripheral image stabilizing remaining amount Ld may be calculated using the image point moving amounts at the center part and the predetermined image height in the image when the image stabilizing optical system 102 is moved by a predetermined amount, and image stabilizing angle information. The lens peripheral image stabilizing remaining amount Ld may be a coefficient of a function (function on the lens peripheral image stabilizing remaining amount) which shows how a value of the lens peripheral image stabilizing remaining amount varies for each image height when the image shake generated at the center part in the image is corrected by the predetermined angle.

Additionally, the camera peripheral image stabilizing remaining amount Cd is the remaining amount of the image stabilization at the peripheral part in the image when the camera image shake corrector 204 corrects the image shake generated at the center part in the image by a predetermined angle, and is the remaining amount of the image stabilization at the predetermined image height in the image. The camera peripheral image stabilizing remaining amount Cd may be calculated using the image point moving amounts at the center part and the predetermined image height in the image when the digital camera is rotated by a predetermined amount. The camera peripheral image stabilizing remaining amount Cd may be a coefficient of a function (function on the camera peripheral image stabilizing remaining amount) which shows how a value of the camera peripheral image stabilizing remaining amount varies for each image height when the image shake generated at the center part in the image is corrected by the predetermined angle.

In step S002, the camera control unit 201 determines whether the lens peripheral image stabilizing remaining amount Ld is smaller than the camera peripheral image stabilizing remaining amount Cd. If the camera control unit 201 determines that the lens peripheral image stabilizing remaining amount Ld is smaller than the camera peripheral image stabilizing remaining amount Cd, the process proceeds to step S003, and if the camera control unit 201 determines that the lens peripheral image stabilizing remaining amount Ld is larger than the camera peripheral image stabilizing remaining amount Cd, the process proceeds to step S005. If the lens peripheral image stabilizing remaining amount Ld is equal to the camera peripheral image stabilizing remaining amount Cd, which step to proceed to can be arbitrarily set.

In steps S003 and S005, the camera control unit 201 determines whether or not a shooting start instruction (referred to as SW) has been input. Specifically, determination is made by detecting whether or not a release button provided on the digital camera has been pressed by a photographer. In step S003, if the camera control unit 201 determines that the SW has been input, the process proceeds to step S004. In step S005, if the camera control unit 201 determines that the SW has been input, the process proceeds to step S006. In steps S003 and S005, if the camera control unit 201 determines that the SW has not been input, the process returns to step S001, and the lens peripheral image stabilizing remaining amount Ld and the camera peripheral image stabilizing remaining amount Cd are acquired again. Thus, even if the photographer changes a focal length and a focus state with a zoom lens, fluctuations of the lens peripheral image stabilizing remaining amount Ld and the camera peripheral image stabilizing remaining amount Cd can be coped with.

In steps S003 and S005, the camera control unit 201 may determine whether or not the shooting start instruction has been input using a method other than pressing the release button by the photographer. For example, the camera control unit 201 may determine whether or not the shooting start instruction from a remote control terminal wirelessly connected to the camera body 2 has been input. Further, based on image information acquired by the image pickup element 202, the camera body 2 may automatically detect a shooting condition to determine whether or not the shooting start instruction has been input.

In step S004, the camera control unit 201 transmits an instruction to start lens side precedence driving control to the lens control unit 104 and starts the lens side precedence driving control. The lens side precedence driving control is continuously performed until an exposure time ends.

In step S006, the camera control unit 201 transmits an instruction to start the camera side precedence driving control to the lens control unit 104 and starts the camera side precedence driving control. The camera side precedence driving control is continuously performed until the exposure time ends.

In this flow, one drive mode is selected from the lens side precedence driving control and the camera side precedence driving control on the basis of the lens peripheral image stabilizing remaining amount Ld and the camera peripheral image stabilizing remaining amount Cd, and the image stabilization is performed on the basis of the selected mode. Timing of the instruction from the camera control unit 201 to the lens control unit 104 in which mode to perform the image stabilization does not matter. For example, immediately after determining which mode to set in step S002, instruction information may be transmitted on the basis of the selection result. In this embodiment, the lens image stabilizing control unit 105 and the lens image shake corrector 106 also perform the lens side precedence driving control or the camera side precedence driving control on the basis of a determination result of the camera control unit 201. In this specification, it is expressed that the camera control unit 201 controls the lens image stabilizing control unit 105 and the lens image shake corrector 106 even if they are controlled indirectly via the lens control unit 104.

When the exposure time ends in steps S004 and S006, the process proceeds to step S007. In step S007, the camera control unit 201 ends the shooting process.

In step S008, the camera control unit 201 determines whether or not a main switch of the digital camera is turned off. If the camera control unit 201 determines that the main switch has been turned off, this flow ends, and if the camera control unit 201 determines that the main switch has not been turned off, the process returns to step S001. In addition to turning off the main switch, this flow may end by determining that the camera main body 2 has switched to a playback mode for playing back an image captured by the camera main body 2 on a display unit (not illustrated).

Referring now to FIG. 3, a description will be given of the lens side precedence driving control. As mentioned above, the image point moving amount generated during camera shake correction differs between the center part and the peripheral part in the image. Thus, performing the image stabilization cannot completely correct the image shake generated at the center part and the peripheral part in the image at the same time. Additionally, the camera peripheral image stabilizing remaining amount Cd and the lens peripheral image stabilizing remaining amount Ld are different. When the lens peripheral image stabilizing remaining amount Ld is smaller than the camera peripheral image stabilizing remaining amount Cd, the lens side image stabilization can reduce the image stabilization remains at the peripheral part in the image as compared with the camera side image stabilization.

In the subroutine of FIG. 3, the image stabilization using the lens image shake corrector 106 is prioritized over the image stabilization using the camera image shake corrector 204, so that the image stabilization remains at the peripheral part can be reduced when a difference of relative moving amount between the central part and the peripheral part is large. Specifically, in this subroutine, when the shake amount applied to the digital camera is an amount that can be corrected without using the camera image shake corrector 204, the image shake is corrected using the lens image shake corrector 106 without using the camera image shake corrector 204. That is, the image stabilization is performed by setting the drive ratio of the lens image shake corrector 106 to 1 and the drive ratio of the camera image shake corrector 204 to 0. In addition, when the shake amount applied to the digital camera is large and the correction angle is insufficient without using the camera image shake corrector 204, the lens image shake corrector 106 is used to correct the image shake, and the camera image shake corrector 204 is used to correct the insufficient correction angle.

The subroutine of FIG. 3 is executed under the control of the camera image stabilizing control unit 203 and the lens image stabilizing control unit 105 by the camera control unit 201 and the lens control unit 104. The lens control unit 104 sets the driving mode of the image stabilization so that the lens image shake corrector 106 performs the image stabilization by the lens side precedence driving control when receiving the instruction to start the lens side precedence driving control, and the subroutine of FIG. 3 is started. In this embodiment, the image pickup element 202 starts an exposure for capturing a recorded image upon receiving the shooting start instruction input in step S003 of FIG. 2 along with the start of the subroutine of FIG. 3.

In step S101, the lens image stabilizing control unit 105 performs the driving control of only the lens image shake corrector 106. The lens image stabilizing control unit 105 calculates a correction amount on the basis of the shake amount applied to the digital camera and performs the driving control of the lens image shake corrector 106 so that the image stabilizing optical system 102 moves on the basis of the calculated correction amount. The shake amount may be acquired on the basis of an output of a sensor that physically measures momentum such as the angular velocity sensor 107, may be acquired on the basis of the image, or may be acquired on the basis of both of them. For example, an output acquired by cutting noise from the output of the angular velocity sensor 107 using a filter is integrated to acquire a deflection angle and the deflection angle is divided by the sensitivity (a variation amount in the optical axis direction per unit moving amount of the image stabilizing optical system 102) to acquire the shake amount.

In step S102, the lens image stabilizing control unit 105 determines whether or not the lens image shake corrector 106 is in a stroke-out state in which the image stabilizing optical system 102 is tried to drive beyond its control range (movable range). If the lens image stabilizing control unit 105 determines that the lens image shake corrector 106 is in the stroke-out state, the process proceeds to step S103, and if the lens image stabilizing control unit 105 determines that the lens image shake corrector 106 is not in the stroke-out state, the process proceeds to step S107.

In step S103, the lens image stabilizing control unit 105 stops the lens image shake corrector 106 at a stroke-out position (control end). Additionally, the camera image stabilizing control unit 203 starts driving of the camera image shake corrector 204, which has been stopped at a reference position (referred to as a center). Such transfer of drive control is executed using the camera image stabilizing control unit 203 and the lens image stabilizing control unit 105 by communication between the camera control unit 201 and the lens control unit 104 via the electrical contacts 3. Specifically, the lens image stabilizing control unit 105 transmits an arrival of an end of the control range of the image stabilizing optical system 102 based on a position signal of the lens image shake corrector 106 and a control state of the lens image stabilizing control unit 105 to the camera control unit 201 via the lens control unit 104 and the electrical contact 3. After that, the camera control unit 201 instructs the camera image stabilizing control unit 203 to start driving of the camera image shake corrector 204. The reference position is a position of the camera image shake corrector 204 when a camera shake correction function is stopped or when the shake amount is 0 and is generally a position where the optical axis is incident near a center of a range (imaging area) used for imaging among a light receiving surface of the image pickup element 202.

In step S104, the camera image stabilizing control unit 203 determines whether or not the camera image shake corrector 204 has returned to the center. If the camera image stabilizing control unit 203 determines that the camera image shake corrector 204 has returned to the center, the process proceeds to step S105, and if the camera image stabilizing control unit 203 determines that the camera image shake corrector 204 has not returned to the center, the process proceeds to step S106.

In step S105, the camera image stabilizing control unit 203 performs positioning control of the camera image shake corrector 204 so that the camera image shake corrector 204 is positioned at the center again at the timing when returning to the center.

In step S106, the camera control unit 201 determines whether or not the exposure time has passed. If the camera control unit 201 determines that the exposure time has passed, this subroutine is ended, and if the camera control unit 201 determines that the exposure time has not passed, the process returns to step S104.

In step S107, the camera control unit 201 determines whether or not the exposure time has passed. If the camera control unit 201 determines that the exposure time has passed, this subroutine is ended, and if the camera control unit 201 determines that the exposure time has not passed, the process returns to step S101.

In this subroutine, the image stabilization by the lens image shake corrector 106 is performed until the lens image shake corrector 106 strokes out. When the lens image shake corrector 106 strokes out, the camera image shake corrector 204 corrects the image shake that cannot be corrected by the lens image shake corrector 106. The lens side precedence driving control is not limited to this. For example, the camera image shake corrector 204 may be driven before the lens image shake corrector 106 strokes out in order to perform the image stabilization by a takeover of driving more smoothly.

That is, in the lens side precedence driving control, when the shake amount applied to the digital camera is equal to or less than a threshold value, the lens image shake corrector 106 is controlled to drive on the basis of the shake amount. On the other hand, if the shake amount applied to the digital camera is larger than the threshold value, the lens image shake corrector 106 is controlled to drive on the basis of an image shake amount corresponding to the threshold value, and the camera image shake corrector 204 is controlled to drive on the basis of an image shake amount corresponding to a difference between the shake amount and the threshold value. For example, the camera control unit 201 performs the driving control of the camera image shake corrector 204 on the basis of a difference between the correction amount acquired on the basis of the shake amount and the correction amount (stroke in the case of FIG. 3) corresponding to the threshold value. As a result, the moving amount of the image stabilizing optical system 102 is suppressed to the image stabilization amount (stroke) corresponding to the threshold value.

Referring now to FIG. 4, a description will be given of the camera side precedence driving control. As mentioned above, the image point moving amount generated during camera shake correction differs between the center part and the peripheral part in the image. Thus, performing the image stabilization cannot completely correct the image shake generated at the center part and the peripheral part in the image at the same time. Additionally, the camera peripheral image stabilizing remaining amount Cd and the lens peripheral image stabilizing remaining amount Ld are different. When the camera peripheral image stabilizing remaining amount Cd is smaller than the lens peripheral image stabilizing remaining amount Ld, the camera side image stabilization can reduce the image stabilization remains at the peripheral part in the image as compared with the lens side image stabilization.

In the subroutine of FIG. 4, the image stabilization using the camera image shake corrector 204 is prioritized over the image stabilization using the lens image shake corrector 106, so that the image stabilization remains at the peripheral part can be reduced when the difference of the relative moving amount between the central part and the peripheral part is large. Specifically, in this subroutine, when the shake amount applied to the digital camera is an amount that can be corrected without using the lens image shake corrector 106, the image shake is corrected using the camera image shake corrector 204 without using the lens image shake corrector 106. That is, the image stabilization is performed by setting the drive ratio of the lens image shake corrector 106 to 0 and the drive ratio of the camera image shake corrector 204 to 1. In addition, when the shake amount applied to the digital camera is large and the correction angle is insufficient without using the lens image shake corrector 106, the camera image shake corrector 204 is used to correct the image shake, and the lens image shake corrector 106 is used to correct the insufficient correction angle.

The subroutine of FIG. 4 is executed under the control of the camera image stabilizing control unit 203 and the lens image stabilizing control unit 105 by the camera control unit 201 and the lens control unit 104. The camera control unit 201 sets the driving mode of the image stabilization so that the camera image shake corrector 204 performs the image stabilization by the camera side precedence driving control when receiving the instruction to start the camera side precedence driving control, and the subroutine of FIG. 4 is started. In this embodiment, the image pickup element 202 starts the exposure for capturing a recorded image upon receiving the shooting start instruction input in step S005 of FIG. 2 along with the start of the subroutine of FIG. 4.

In step S201, the camera image stabilizing control unit 203 performs the driving control of only the camera image shake corrector 204. The camera image stabilizing control unit 203 calculates a correction amount on the basis of the shake amount applied to the digital camera and performs the driving control of the camera image shake corrector 204 so that the image pickup element 202 moves on the basis of the calculated correction amount. The shake amount may be acquired on the basis of an output of a sensor that physically measures momentum such as the angular velocity sensor 107, may be acquired on the basis of the image, or may be acquired on the basis of both of them. For example, an output acquired by cutting noise from the output of the angular velocity sensor 107 using a filter is integrated to acquire a deflection angle and the deflection angle is divided by the sensitivity (a variation amount in the optical axis direction per unit moving amount of the image stabilizing optical system 102) to acquire the shake amount.

In step S202, the camera image stabilizing control unit 203 determines whether or not the camera image shake corrector 204 is in a stroke-out state in which the image pickup element 202 is tried to drive beyond its control range (movable range). If the camera image stabilizing control unit 203 determines that the camera image shake corrector 204 is in the stroke-out state, the process proceeds to step S203, and if the camera image stabilizing control unit 203 determines that the camera image shake corrector 204 is not in the stroke-out state, the process proceeds to step S207.

In step S203, the camera image stabilizing control unit 203 stops the camera image shake corrector 204 at a stroke-out position (control end). Additionally, the lens image stabilizing control unit 105 also starts driving of the lens image shake corrector 106, which has been stopped at a reference position (referred to as a center). Such transfer of drive control is executed using the camera image stabilizing control unit 203 and the lens image stabilizing control unit 105 by communication between the camera control unit 201 and the lens control unit 104 via the electrical contacts 3. Specifically, the camera image stabilizing control unit 203 transmits an arrival of an end of the control range of the image pickup element 202 based on a position signal of the camera image shake corrector 204 and a control state of the camera image stabilizing control unit 203 to the lens control unit 104 via the camera control unit 201 and the electrical contact 3. After that, the lens control unit 104 instructs the lens image stabilizing control unit 105 to start the driving of the lens image shake corrector 106. The reference position is a position of the lens image shake corrector 106 when the camera shake correction function is stopped or when the shake amount is 0 and is generally the position where the optical axis is incident near the center of the range (imaging area) used for imaging among the light receiving surface of the image pickup element 202.

In step S204, the lens image stabilizing control unit 105 determines whether or not the lens image shake corrector 106 has returned to the center. If the lens image stabilizing control unit 105 determines that the lens image shake corrector 106 has returned to the center, the process proceeds to step S205, and if the lens image stabilizing control unit 105 determines that the lens image shake corrector 106 has not returned to the center, the process proceeds to step S206.

In step S205, the lens image stabilizing control unit 105 performs positioning control of the lens image shake corrector 106 so that the lens image shake corrector 106 is positioned at the center again at the timing when returning to the center.

In step S206, the camera control unit 201 determines whether or not the exposure time has passed. If the camera control unit 201 determines that the exposure time has passed, this subroutine is ended, and if the camera control unit 201 determines that the exposure time has not passed, the process returns to step S204.

In step S207, the camera control unit 201 determines whether or not the exposure time has passed. If the camera control unit 201 determines that the exposure time has passed, this subroutine is ended, and if the camera control unit 201 determines that the exposure time has not passed, the process returns to step S201.

In this subroutine, the image stabilization by the camera image shake corrector 204 is performed until the camera image shake corrector 204 strokes out. When the camera image shake corrector 204 strokes out, the lens image shake corrector 106 corrects the image shake that cannot be corrected by the camera image shake corrector 204. The camera side precedence driving control is not limited to this. For example, the lens image shake corrector 106 may be driven before the camera image shake corrector 204 strokes out in order to perform the image stabilization by a takeover of driving more smoothly.

That is, in the camera side precedence driving control, when the shake amount applied to the digital camera is equal to or less than the threshold value, the camera image shake corrector 204 is controlled to drive on the basis of the shake amount. On the other hand, if the shake amount applied to the digital camera is larger than the threshold value, the camera image shake corrector 204 is controlled to drive on the basis of the image shake amount corresponding to the threshold value, and the lens image shake corrector 106 is controlled to drive on the basis of the image shake amount corresponding to the difference between the shake amount and the threshold value. For example, the lens control unit 105 performs the driving control of the lens image shake corrector 106 on the basis of a difference between the correction amount acquired on the basis of the shake amount and the correction amount (stroke in the case of FIG. 4) corresponding to the threshold value. As a result, the moving amount of the image pickup element 202 is suppressed to the image stabilization amount (stroke) corresponding to the threshold value.

Figure 5A:
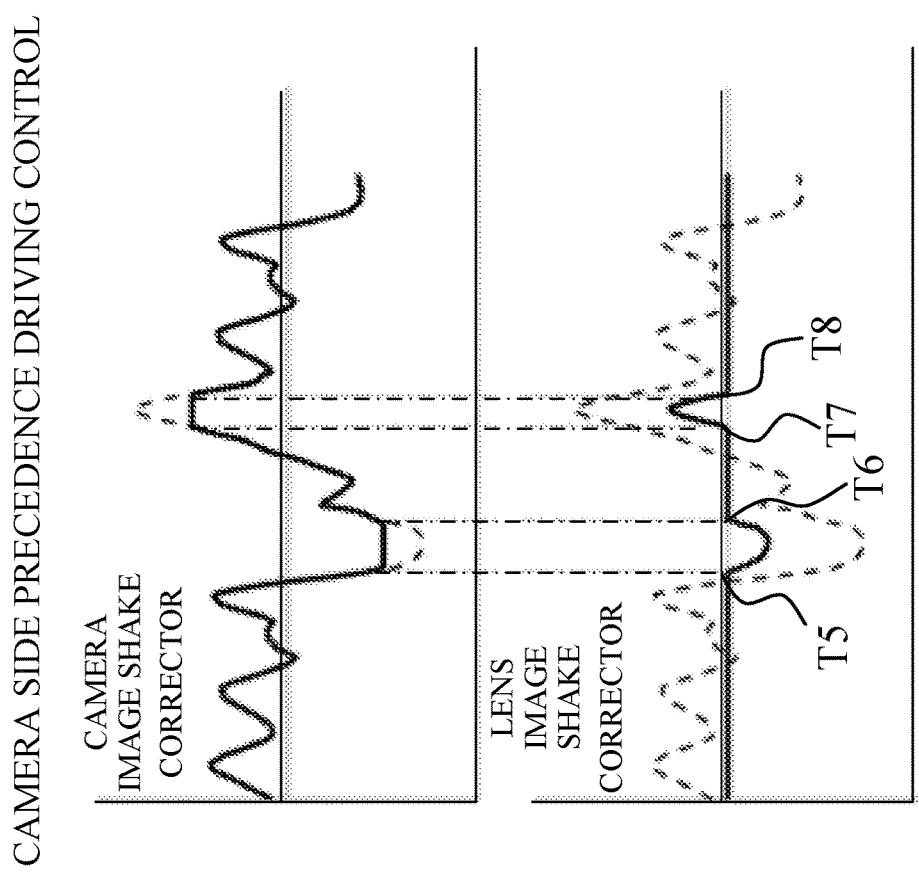
FIGS. 5A and 5B are explanatory diagrams of the image stabilization executed by the digital camera according to this embodiment.
Figure 5B:
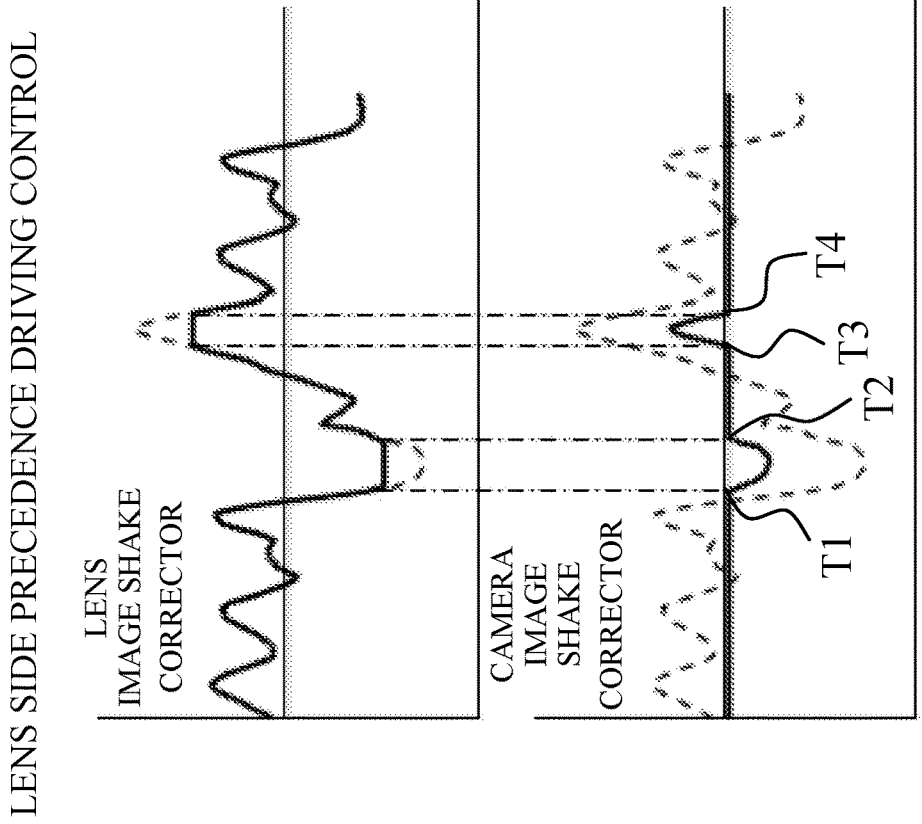

FIGS. 5A and 5B are explanatory diagrams of the image stabilization executed by the digital camera according to this embodiment and illustrate how the image shake corrector is driven in the lens side precedence driving control and the camera side precedence driving control. Here, driving the image shake corrector refers to driving the image shake corrector to move the image pickup element 202 or the image stabilizing optical system 102, and driving to hold each position at a predetermined position shall not be included.

In FIGS. 5A and 5B, the horizontal axis represents time, and the vertical axis represents the correction amount of the image shake corrector in degrees. Assume that the exposure start time is at the left end of the graph, and that exposure is continuously performed within the time axis of the graph. FIGS. 5A and 5B respectively illustrate how the image shake corrector is driven under the lens side precedence driving control the camera side precedence driving control.

As illustrated in FIG. 5A, in the lens side precedence driving control, only the lens image shake corrector 106 is driven at the beginning of the control (that is, immediately after the start of the exposure) at the left end of the graph (corresponding to step S101 in FIG. 3). At time T1, the arrival of the control end of the lens image shake corrector 106 (that is, stroke out) is detected (corresponding to step S102 in FIG. 3). After time T1, the lens image shake corrector 106 stops at the control end, and the camera image shake corrector 204 starts driving (corresponding to step S103 in FIG. 3). At time T2, when returning to the center, the camera image shake corrector 204 is controlled to be positioned at the center (corresponding to steps S104 and S105 in FIG. 3). At time T2, the lens image shake corrector 106 takes over driving (corresponding to the second time in step S101 in FIG. 3), and at time T3, the driving of only the lens image shake corrector 106 continues until the lens image shake corrector 106 reaches the control end. From time T3 to time T4, similarly to from time T1 to time T2, the lens image shake corrector 106 stops at the control end, and the driving control of only the camera image shake corrector 204 is performed. Thus, in the lens side precedence driving control, the lens image shake corrector 106 and the camera image shake corrector 204 are alternately driven. By preferentially using the lens image shake corrector 106, the difference between the image stabilizing remaining amounts at the center part and the peripheral part in the image is reduced, and the image shake of the entire image is reduced.

As illustrated in FIG. 5B, in the camera side precedence driving control, only the camera image shake corrector 204 is driven at the beginning of the control (that is, immediately after the start of the exposure) at the left end of the graph (corresponding to step S201 in FIG. 4). At time T5, the arrival of the control end of the camera image shake corrector 204 (that is, stroke out) is detected (corresponding to step S202 in FIG. 4). After time T5, the camera image shake corrector 204 stops at the control end, and the lens image shake corrector 106 starts driving (corresponding to step S203 in FIG. 4). At time T6, when returning to the center, the lens image shake corrector 106 is controlled to be positioned at the center (corresponding to steps S204 and S205 in FIG. 4). At time T6, the camera image shake corrector 204 takes over driving (corresponding to the second time in step S201 in FIG. 4), and at time T7, the driving of only camera lens image shake corrector 204 continues until the camera image shake corrector 204 reaches the control end. From time T7 to time T8, similarly to from time T5 to time T6, the camera image shake corrector 204 stops at the control end, and the driving control of only the lens image shake corrector 106 is performed. Thus, in the camera side precedence driving control, the camera image shake corrector 204 and the lens image shake corrector 106 are alternately driven. By preferentially using the camera image shake corrector 204, the difference between the image stabilizing remaining amounts at the center part and the peripheral part in the image is reduced, and the image shake of the entire image is reduced.

Second Embodiment

Image stabilization performed by a digital camera according to this embodiment determines driving amounts of two image shake correctors on the basis of the information stored in the lens storage unit 103 while the camera control unit 201 communicates with the lens control unit 104 via the electrical contact 3.

Figure 6:
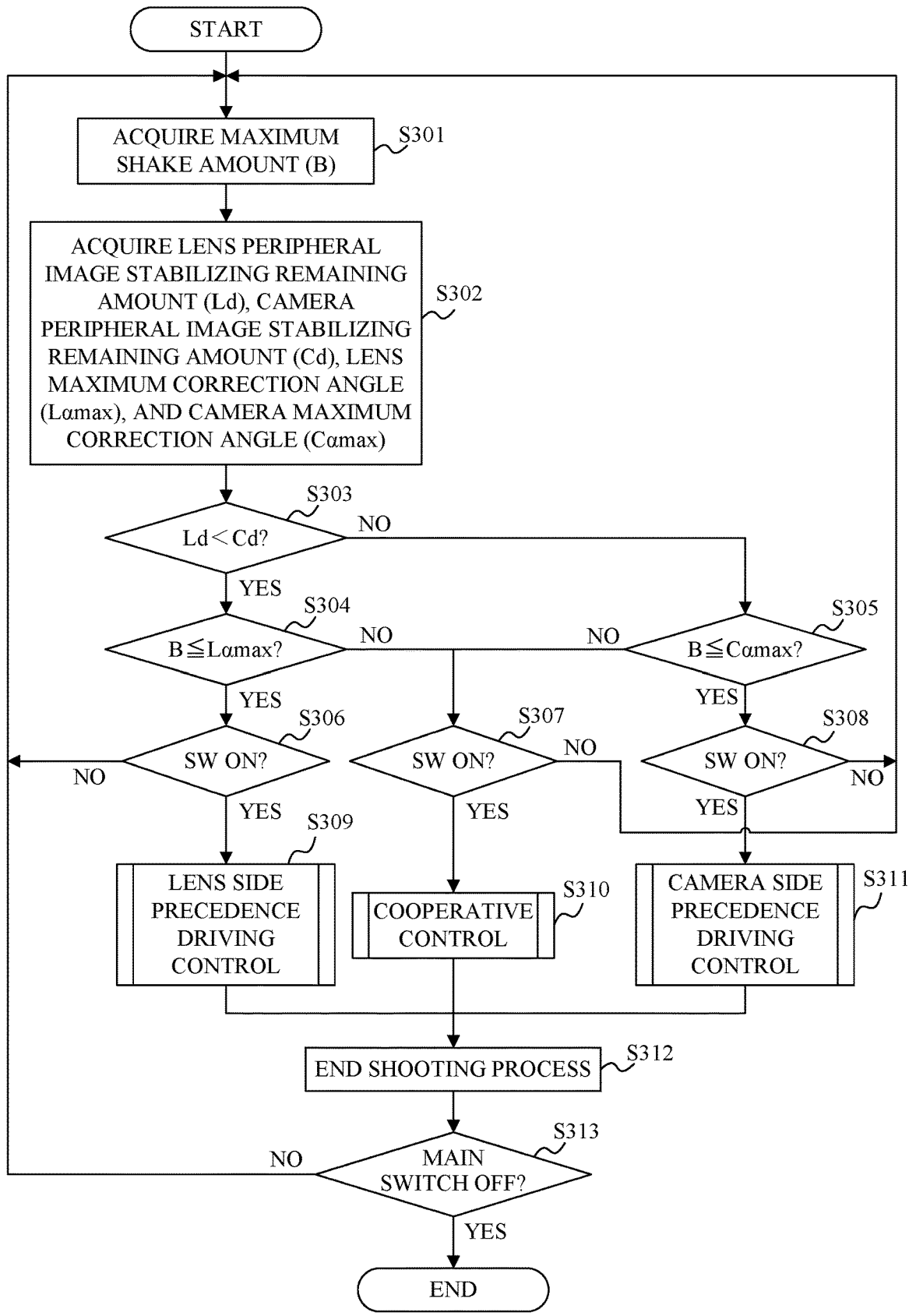
FIG. 6 is a flowchart illustrating image stabilization executed by a digital camera according to second embodiment.
Figure 7:
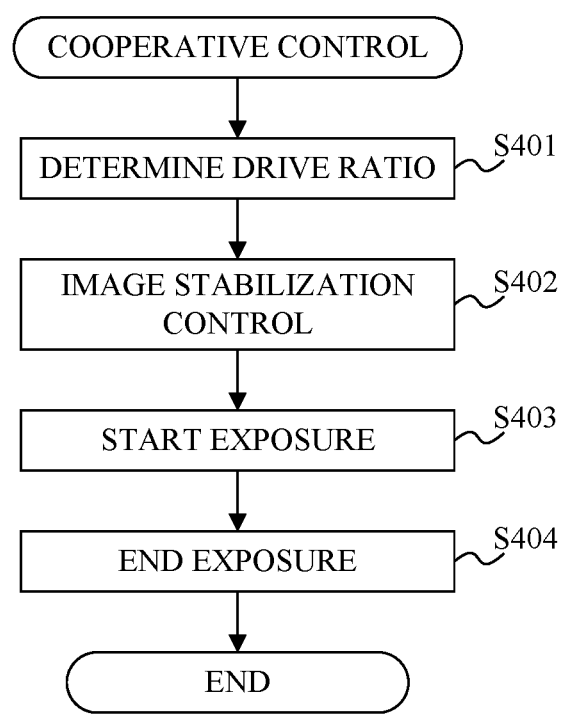
FIG. 7 is a flowchart illustrating cooperative control executed by the digital camera according to the second embodiment.

The image stabilization according to this embodiment includes an entire flow of the image stabilization in FIG. 6, and a subroutine (FIG. 7) called "cooperative control" in FIG. 6. FIG. 6 is a flowchart illustrating the image stabilization executed by the digital camera according to this embodiment. FIG. 7 is a flowchart illustrating the cooperative control executed by the digital camera according to this embodiment.

The entire flow of the image stabilization in FIG. 6 is started when the power of the digital camera is turned on or when the sleep state is restored.

In step S301, a maximum shake amount B detected in a preparatory stage is acquired. The shake amount may be acquired on the basis of the output of the sensor that physically measures momentum such as the angular velocity sensor 107, may be acquired on the basis of the image, or may be acquired on the basis of both of them. For example, the output acquired by cutting noise from the output of the angular velocity sensor 107 using the filter is integrated to acquire the deflection angle and the deflection angle is divided by the sensitivity (the variation amount in the optical axis direction per unit moving amount of the image stabilizing optical system 102) to acquire the shake amount.

In step S302, the camera control unit 201 acquires the lens peripheral image stabilizing remaining amount Ld and the camera peripheral image stabilizing remaining amount Cd stored in the lens storage unit 103 via the electrical contact 3 and the lens control unit 104.

As described above, the lens peripheral image stabilizing remaining amount Ld is the remaining amount of the image stabilization at the peripheral part in the image when the lens image shake corrector 106 corrects the image shake generated at the center part in the image by a predetermined angle, and is the remaining amount of the image stabilization at the predetermined image height in the image. The lens peripheral image stabilizing remaining amount Ld may be the coefficient of the function shows how the value of the lens peripheral image stabilizing remaining amount varies for each image height when the image shake generated at the center part in the image is corrected by the predetermined angle.

Additionally, the camera peripheral image stabilizing remaining amount Cd is the remaining amount of the image stabilization at the peripheral part in the image when the camera image shake corrector 204 corrects the image shake generated at the center part in the image by the predetermined angle, and is the remaining amount of the image stabilization at the predetermined image height in the image. The camera peripheral image stabilizing remaining amount Cd may be calculated using the image point moving amounts at the center part and the predetermined image height in the image when the digital camera is rotated by the predetermined amount. The camera peripheral image stabilizing remaining amount Cd may be the coefficient of the function shows how the value of the camera peripheral image stabilizing remaining amount varies for each image height when the image shake generated at the center part in the image is corrected by the predetermined angle.

Additionally, in step S302, the camera control unit 201 acquires a lens maximum correction angle Lαmax and a camera maximum correction angle Cαmax stored in the lens storage unit 103 via the electrical contact 3 and the lens control unit 104. The lens maximum correction angle Lαmax is an image stabilization angle when the lens image shake corrector 106 is driven by the maximum amount. In addition, the camera maximum correction angle Cαmax is an image stabilization angle when the camera image shake corrector 204 is driven by the maximum amount. In this embodiment, the camera control unit 201 acquires the lens maximum correction angle Lαmax, but may acquire a maximum stroke of the image stabilizing optical system 102 and image shake angle sensitivity which is a correction angle when the image stabilizing optical system 102 is driven by a unit amount instead of the lens maximum correction angle to calculate the lens maximum correction angle. Moreover, the camera control unit 201 acquires the camera maximum correction angle Cαmax, but may acquire a maximum stroke of the image pickup element 202 and image shake angle sensitivity which is a correction angle when the image pickup element 202 is driven by a unit amount instead of the camera maximum correction angle to calculate the camera maximum correction angle.

In step S303, the camera control unit 201 determines whether the lens peripheral image stabilizing remaining amount Ld is smaller than the camera peripheral image stabilizing remaining amount Cd. If the camera control unit 201 determines that the lens peripheral image stabilizing remaining amount Ld is smaller than the camera peripheral image stabilizing remaining amount Cd, the process proceeds to step S304, and if the camera control unit 201 determines that the lens peripheral image stabilizing remaining amount Ld is larger than the camera peripheral image stabilizing remaining amount Cd, the process proceeds to step S305. If the lens peripheral image stabilizing remaining amount Ld is equal to the camera peripheral image stabilizing remaining amount Cd, which step to proceed to can be arbitrarily set.

In step S304, the camera control unit 201 determines whether or not the maximum shake angle B acquired in step S301 is equal to or less than the lens maximum correction angle Lαmax (threshold value). Thereby, whether or not the image stabilization using only the lens image shake corrector 106 for the maximum shake amount B can be performed is determined. That is, when the maximum shake amount B is equal to or less than the lens maximum correction angle Lαmax, performing the image stabilization using only the lens image shake corrector 106 can be performed. On the other hand, if the image stabilization is performed using only the lens image shake corrector 106 when the maximum shake amount B is larger than the lens maximum correction angle Lαmax, the lens image shake corrector 106 strokes out and the image shake cannot be corrected completely. If the camera control unit 201 determines that the maximum shake amount B is equal to or smaller than the lens maximum correction angle Lαmax, the process proceeds to step S306, and if the camera control unit 201 determines that the maximum shake amount B is larger than the lens maximum correction angle Lαmax, the process proceeds to step S307.

In step S305, the camera control unit 201 determines whether or not the maximum shake angle B acquired in step S301 is equal to or less than the camera maximum correction angle Cαmax (threshold value). Thereby, whether or not the image stabilization using only the camera image shake corrector 204 for the maximum shake amount B can be performed is determined. That is, when the maximum shake amount B is equal to or less than the camera maximum correction angle Cαmax, the image stabilization using only the camera image shake corrector 204 can be performed. On the other hand, if the image stabilization is performed using only the camera image shake corrector 204 when the maximum shake amount B is larger than the camera maximum correction angle Cαmax, the camera image shake corrector 204 strokes out and the image shake cannot be corrected completely. If the camera control unit 201 determines that the maximum shake amount B is equal to or smaller than the camera maximum correction angle Cαmax, the process proceeds to step S308, and if the camera control unit 201 determines that the maximum shake amount B is larger than the camera maximum correction angle Cαmax, the process proceeds to step S307.

In steps S306, S307, and S308, the camera control unit 201 determines whether or not the shooting start instruction (referred to as SW) has been input. Specifically, determination is made by detecting whether or not the release button provided on the digital camera has been pressed by the photographer. In step S306, if the camera control unit 201 determines that the SW has been input, the process proceeds to step S309. In step S307, if the camera control unit 201 determines that the SW has been input, the process proceeds to step S310. In step S308, if the camera control unit 201 determines that the SW has been input, the process proceeds to step S311. In steps S306, S307, and S308, if the camera control unit 201 determines that the SW has not been input, the process returns to step S301, and the maximum shake amount B is acquired again. After that, in step S302, the lens peripheral image stabilizing remaining amount Ld and the camera peripheral image stabilizing remaining amount Cd are acquired again. Thus, even if the photographer changes the focal length and the focus state with the zoom lens, fluctuations of the lens peripheral image stabilizing remaining amount Ld and the camera peripheral image stabilizing remaining amount Cd can be coped with.

In steps S306, S307, and S308, the camera control unit 201 may determine whether or not the shooting start instruction has been input using the method other than pressing the release button by the photographer. For example, the camera control unit 201 may determine whether or not the shooting start instruction from the remote control terminal wirelessly connected to the camera body 2 has been input. Further, based on the image information acquired by the image pickup element 202, the camera body 2 may automatically detect the shooting condition to determine whether or not the shooting start instruction has been input.

In step S309, the camera control unit 201 transmits the instruction to start the lens side precedence driving control to the lens control unit 104 and starts the lens side precedence driving control. The lens side precedence driving control is continuously performed until the exposure time ends.

In step S310, the camera control unit 201 transmits an instruction to start the cooperative control to the lens control unit 104 and the camera image stabilizing control unit 203 and starts the cooperative control. The cooperative control is continuously performed until the exposure time ends.

In step S311, the camera control unit 201 transmits the instruction to start the camera side precedence driving control to the lens control unit 104 and starts the camera side precedence driving control. The camera side precedence driving control is continuously performed until the exposure time ends.

In this flow, one drive mode is selected from the lens side precedence driving control, the camera side precedence driving control, and the cooperative control on the basis of the lens peripheral image stabilizing remaining amount Ld, the camera peripheral image stabilizing remaining amount Cd, the lens maximum correction angle Lαmax, and the camera maximum correction angle Cαmax. And the image stabilization is performed on the basis of the selected mode. Timing of the instruction from the camera control unit 201 to the lens control unit 104 in which mode to perform the image stabilization does not matter. For example, immediately after determining which mode to set in steps S304 and S305, instruction information may be transmitted on the basis of the selection result. In this embodiment, the lens image stabilizing control unit 105 and the lens image shake corrector 106 also perform the lens side precedence driving control, the camera side precedence driving control or the cooperative control on the basis of the determination result of the camera control unit 201. In this specification, it is expressed that the camera control unit 201 controls the lens image stabilizing control unit 105 and the lens image shake corrector 106 even if they are controlled indirectly via the lens control unit 104.

When the exposure time ends in steps S309, S310, and S311, the process proceeds to step S312. In step S312, the camera control unit 201 ends the shooting process.

In step S313, the camera control unit 201 determines whether or not the main switch of the digital camera is turned off. If the camera control unit 201 determines that the main switch has been turned off, this flow ends, and if the camera control unit 201 determines that the main switch has not been turned off, the process returns to step S301. In addition to turning off the main switch, this flow may end by determining that the camera main body 2 has switched to the playback mode for playing back the image captured by the camera main body 2 on the display unit (not illustrated).

Referring now to FIG. 7, a description will be given of the cooperative control. In the subroutine of FIG. 7, when the shake amount applied to the digital camera may exceed the lens maximum correction angle Lαmax or the camera maximum correction angle Cαmax, the image stabilization using the lens image shake corrector 106 and the camera image shake corrector 204 is performed.

After the lens image stabilizing control unit 105 determines that the lens image shake corrector 106 has stroked out, the interchangeable lens 1 notifies the camera main body 2 of this fact by communication. After that, when the drive control of the camera image shake corrector 204 is performed, the drive of the camera image shake corrector 204 may be delayed. Additionally, the camera body 2 and the interchangeable lens 1 need to communicate with each other during the exposure period. Communication between the camera body 2 and the interchangeable lens 1 takes longer than communication between each block inside the camera body 2 and inside the interchangeable lens 1 and thus accuracy of the image stabilization may decrease due to communication delays.

In the subroutine of FIG. 7, the drive ratio, which is sharing ratio of the image stabilization between the lens image shake corrector 106 and the camera image shake corrector 204, is determined, and performing the image stabilization at each drive ratio decreases influence of the communication delays.

The subroutine of FIG. 7 is executed under the control of the camera image stabilizing control unit 203 and the lens image stabilizing control unit 105 by the camera control unit 201 and the lens control unit 104. The lens control unit 104 sets the driving mode of the image stabilization so that the lens image shake corrector 106 performs the image stabilization by the cooperative control when receiving the instruction to start the cooperative control, and the subroutine of FIG. 7 is started.

In step S401, the camera control unit 201 determines the drive ratio on the basis of the lens maximum correction angle Lαmax and the camera maximum correction angle Cαmax.

In step S402, image stabilization control is started on the basis of the drive ratio determined in step S401. For example, a description will be given of a case where the lens side drive ratio and the camera side drive ratio determined in step S401 are respectively 0.4 and 0.6, and the digital camera is rotated by an angle θ. In this case, the lens image shake corrector 106 is set to correct an angle of 0.4·θ, and the camera image shake corrector 204 is set to correct an angle of 0.6·θ. For example, the lens image stabilizing control unit 105 may acquires the lens side image stabilization amount and the camera side image stabilization amount on the basis of the shake amount applied to the digital camera and the drive ratio and may transmits the camera side image stabilization amount to the camera body 2 to perform the driving control. Additionally, when the interchangeable lens 1 and the camera body 2 can respectively acquire the shake amount, each image stabilizing control unit may acquire the image stabilization amount on the basis of the drive ratio acquired in step S401 and the respective acquired shake amount. In this case, the camera body 2 and the interchangeable lens 1 respectively acquire the image stabilization amount and thus can respectively perform the image stabilization once the drive ratio is transmitted to the interchangeable lens 1. Accordingly, the influence of the communication delays can be decreased, and the amount of communication can be reduced. The driving control started in this step continues until the exposure ends.

In step S403, the exposure starts.

In step S404, the exposure ends.

Through the cooperative control, the strokes of each image shake corrector can be utilized to the maximum.

FIG. 8 is an explanatory diagram of the cooperative control and illustrates how each image shake corrector is driven. Here, driving the image shake corrector refers to driving the image shake corrector to move the image pickup element 202 or the image stabilizing optical system 102, and driving to hold each position at a predetermined position shall not be included.

In FIG. 8, the horizontal axis represents time, and the vertical axis represents the correction amount of the image shake corrector in degrees. Assume that the exposure start time is at the left end of the graph, and that exposure is continuously performed within the time axis of the graph.

In FIG. 8, the cooperative control is performed on the basis of the drive ratio determined in step S401 of FIG. 7. That is, during the exposure period illustrated in the graph, the image shake corrector is driven and controlled with waveforms similar to each other at a predetermined ratio.

Switching the lens side precedence driving control, the camera side precedence driving control, and the cooperative control described using FIGS. 6 to 8 can realize the image stabilization appropriate for the image pickup optical system 101.

Third Embodiment

Figure 9:
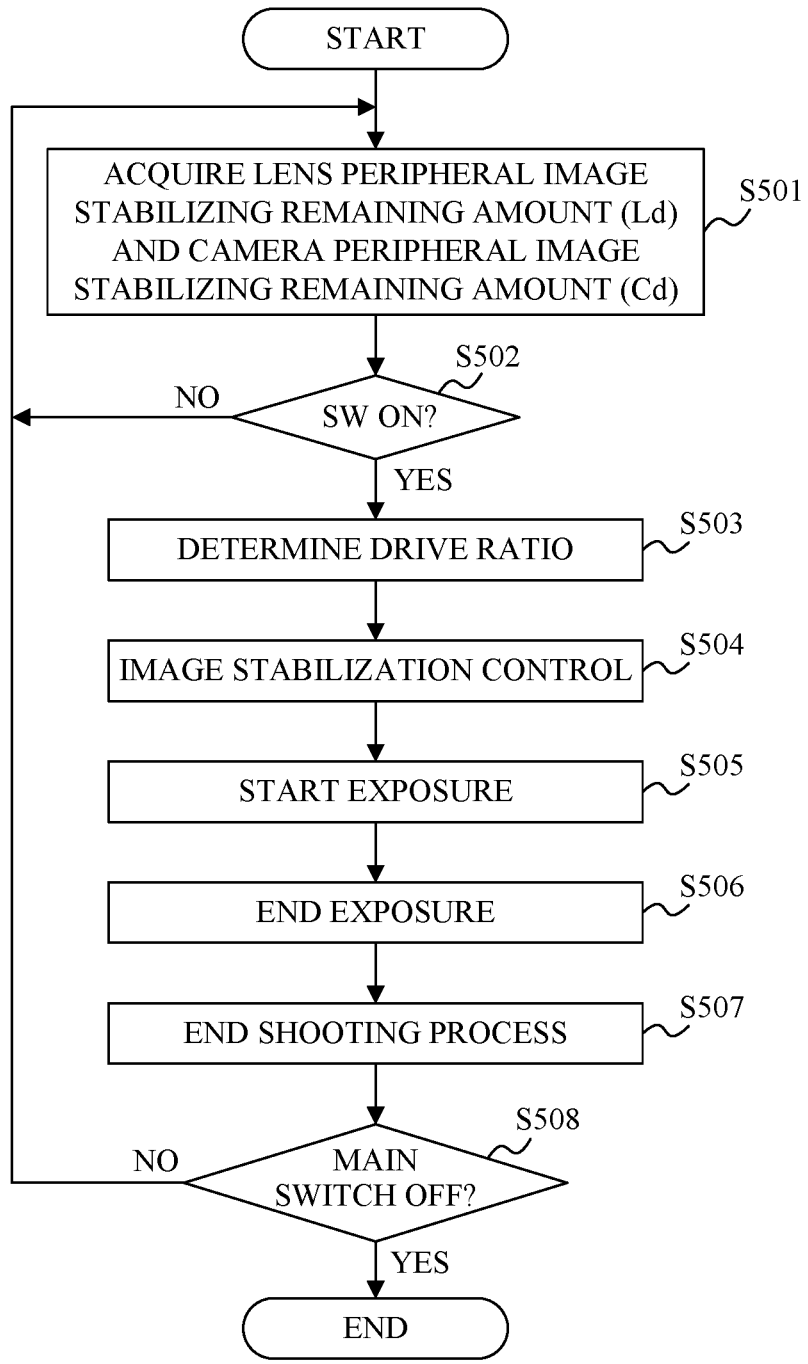
FIG. 9 is a flowchart illustrating lens stabilization executed by a digital camera according to third embodiment.

Image stabilization performed by a digital camera according to this embodiment determines driving amounts of two image shake correctors on the basis of the information stored in the lens storage unit 103 while the camera control unit 201 communicates with the lens control unit 104 via the electrical contact 3. FIG. 9 is a flowchart illustrating the image stabilization executed by the digital camera according to this embodiment. The entire flow of the image stabilization in FIG. 9 is started when the power of the digital camera is turned on or when the sleep state is restored.

In step S501, the camera control unit 201 acquires the lens peripheral image stabilizing remaining amount Ld and the camera peripheral image stabilizing remaining amount Cd stored in the lens storage unit 103 via the electrical contact 3 and the lens control unit 104.

As described above, the lens peripheral image stabilizing remaining amount Ld is the remaining amount of the image stabilization at the peripheral part in the image when the lens image shake corrector 106 corrects the image shake generated at the center part in the image by a predetermined angle, and is the remaining amount of the image stabilization at the predetermined image height in the image. The lens peripheral image stabilizing remaining amount Ld may be the coefficient of the function which shows how a value of the lens peripheral image stabilizing remaining amount varies for each image height when the image shake generated at the center part in the image is corrected by the predetermined angle.

Additionally, the camera peripheral image stabilizing remaining amount Cd is the remaining amount of the image stabilization at the peripheral part in the image when the camera image shake corrector 204 corrects the image shake generated at the center part in the image by a predetermined angle, and is the remaining amount of the image stabilization at the predetermined image height in the image. The camera peripheral image stabilizing remaining amount Cd may be the coefficient of the function which shows how a value of the camera peripheral image stabilizing remaining amount varies for each image height when the image shake generated at the center part in the image is corrected by the predetermined angle.

In step S502, the camera control unit 201 determines whether or not the shooting start instruction (referred to as SW) has been input. Specifically, determination is made by detecting whether or not the release button provided on the digital camera has been pressed by the photographer. If the camera control unit 201 determines that the SW has been input, the process proceeds to step S503, and if the camera control unit 201 determines that the SW has not been input, the process returns to step S501.

In step S503, the camera control unit 201 determines the drive ratio on the basis of the lens peripheral image stabilizing remaining amount Ld and the camera peripheral image stabilizing remaining amount Cd.

In step S504, image stabilization control is started on the basis of the drive ratio determined in step S503. For example, a description will be given of a case where the lens side drive ratio and the camera side drive ratio determined in step S501 are respectively 0.4 and 0.6, and the digital camera is rotated by an angle θ. In this case, the lens image shake corrector 106 is set to correct an angle of 0.4·θ, and the camera image shake corrector 204 is set to correct an angle of 0.6·θ.

In step S505, the exposure starts.

In step S506, the exposure ends.

In step S507, the camera control unit 201 ends the shooting process.

In step S508, the camera control unit 201 determines whether or not the main switch of the digital camera has been turned off. If the camera control unit 201 determines that the main switch has been turned off, this flow ends, and if the camera control unit 201 determines that the main switch has been not turned off, the process returns to step S501. In addition to turning off the main switch, this flow may end by determining that the camera main body 2 has switched to the playback mode for playing back the image captured by the camera main body 2 on the display unit (not illustrated).

A description will be given of a method of determining the drive ratio in step S503 according to this embodiment. In step S503, the driving ratio is determined on the basis of the lens peripheral image stabilizing remaining amount Ld and the camera peripheral image stabilizing remaining amount Cd. When the drive ratio on the camera side is CIS and the drive ratio on the lens side is LIS, the drive ratios CIS and LIS are determined using the following equations (1) and (2), respectively.

[Number 1]

$$CIS = \frac{|Ld|}{|Ld| + |Cd|} \quad (1)$$

$$LIS = \frac{|Cd|}{|Ld| + |Cd|} \quad (2)$$

As shown in equations (1) and (2), in this embodiment, the driving ratio is determined so that the image shake corrector on the side with the smaller peripheral image stabilizing remaining amount is driven more.

For example, the peripheral image stabilizing remaining amount is 0.01 mm (=Ld) in correcting the image shake when the digital camera is rotated by 1° using the lens image shake corrector 106 to stop the center part in the image. Additionally, the peripheral image stabilizing remaining amount is 0.03 mm (=Cd) in correcting the image shake when the digital camera is rotated by 1° using the camera image shake corrector 204 to stop the center part in the image. In this case, when the digital camera is rotated by an angle θ, the lens image shake corrector 106 is set to correct an angle of 0.75·θ, and the camera image shake corrector 204 is set to correct an angle of 0.25·θ. As a result, the image stabilization can be performed while reducing the peripheral image stabilizing remaining amount.

In addition, for example, the peripheral image stabilizing remaining amount is 0.01 mm (=Ld) in correcting the image shake when the digital camera is rotated by 1° using the lens image shake corrector 106 to stop the center part in the image. Additionally, the peripheral image stabilizing remaining amount is −0.03 mm (=Cd) in correcting the image shake when the digital camera is rotated by 1° using the camera image shake corrector 204 to stop the center part in the image. In this example, the peripheral image stabilizing remaining amount in correcting the image shake at the center part in the image when the digital camera is rotated by the predetermined angle using the lens image shake corrector 106 has a sign opposite to that of the peripheral image stabilizing remaining amount in correcting the image shake at the center part in the image when the digital camera is rotated by the predetermined angle using the camera image shake corrector 204. In this case, when the digital camera is rotated by an angle θ, the lens image shake corrector 106 is set to correct an angle of 0.75·θ, and the camera image shake corrector 204 is set to correct an angle of 0.25·θ. This makes it possible to set the peripheral image stabilizing remaining amount to 0 and reduce the image stabilizing remaining amount for the entire image.

Fourth Embodiment

Figure 10:
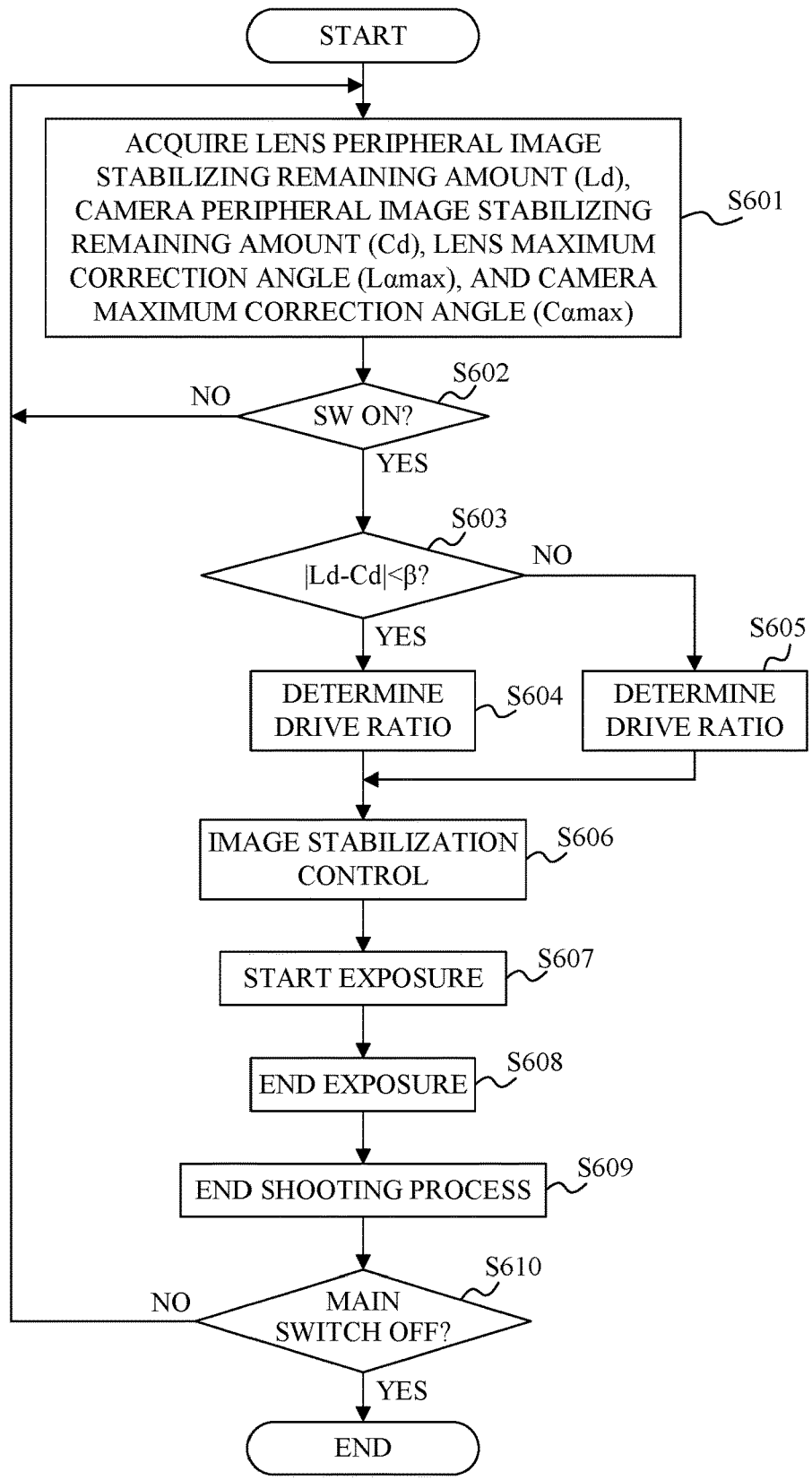
FIG. 10 is a flowchart illustrating lens stabilization executed by a digital camera according to fourth embodiment.

Image stabilization performed by a digital camera according to this embodiment determines driving amounts of two image shake correctors on the basis of the information stored in the lens storage unit 103 while the camera control unit 201 communicates with the lens control unit 104 via the electrical contact 3. FIG. 10 is a flowchart illustrating the image stabilization executed by the digital camera according to this embodiment. The flow of FIG. 10 is started when the power of the digital camera is turned on or when the sleep state is restored.

In step S601, the camera control unit 201 acquires the lens peripheral image stabilizing remaining amount Ld and the camera peripheral image stabilizing remaining amount Cd stored in the lens storage unit 103 via the electrical contact 3 and the lens control unit 104.

As described above, the lens peripheral image stabilizing remaining amount Ld is the remaining amount of the image stabilization at the peripheral part in the image when the lens image shake corrector 106 corrects the image shake generated at the center part in the image by the predetermined angle, and is the remaining amount of the image stabilization at the predetermined image height in the image. The lens peripheral image stabilizing remaining amount Ld may be the coefficient of the function shows how the value of the lens peripheral image stabilizing remaining amount varies for each image height when the image shake generated at the center part in the image is corrected by the predetermined angle.

Additionally, the camera peripheral image stabilizing remaining amount Cd is the remaining amount of the image stabilization at the peripheral part in the image when the camera image shake corrector 204 corrects the image shake generated at the center part in the image by the predetermined angle, and is the remaining amount of the image stabilization at the predetermined image height in the image. The camera peripheral image stabilizing remaining amount Cd may be the coefficient of the function shows how the value of the camera peripheral image stabilizing remaining amount varies for each image height when the image shake generated at the center part in the image is corrected by the predetermined angle.

In step S602, the camera control unit 201 determines whether or not the shooting start instruction (referred to as SW) has been input. Specifically, determination is made by detecting whether or not the release button provided on the digital camera has been pressed by the photographer. If the camera control unit 201 determines that the SW has been input, the process proceeds to step S603, and if the camera control unit 201 determines that the SW has not been input, the process returns to step S601.

In step S603, the camera control unit 201 determines whether or not an absolute value of a difference between the lens peripheral image stabilizing remaining amount Ld and the camera peripheral image stabilizing remaining amount Cd is smaller than a predetermined amount β. If the camera control unit 201 determines that the absolute value of the difference is smaller than the predetermined amount β, the process proceeds to step S604. In this case, there is almost no difference in the image stabilizing remaining amount at the peripheral part between the image stabilization by the lens image shake corrector 106 and the image stabilization by the camera image shake corrector 204, and thus there is no difference in the image stabilizing remaining amount at the peripheral part regardless of which image stabilization is performed. In step S604, the camera control unit 201 determines which image shake corrector to use. Specifically, the camera control unit 201 sets the drive ratio of one image shake corrector to 1, and the drive ratio of the other image shake corrector to 0.

On the other hand, in step S603, if the absolute value of the difference is larger than the predetermined amount β, the process proceeds to step S605. In step S605, the camera control unit 201 determines the drive ratio on the basis of the lens peripheral image stabilizing remaining amount Ld and the camera peripheral image stabilizing remaining amount Cd, as in step S503 of FIG. 9.

In step S603, if the absolute value of the difference is equal to the predetermined amount β, which step to proceed to can be arbitrarily set.

In step S606, image stabilization control is started on the basis of the drive ratio determined in step S604 or step S605. For example, when the lens side drive ratio and the camera side drive ratio are respectively 0.4 and 0.6, and the digital camera is rotated by an angle θ, the lens image shake corrector 106 is set to correct an angle of 0.4·θ, and the camera image shake corrector 204 is set to correct an angle of 0.6·θ.

In step S607, the exposure starts.

In step S608, the exposure ends.

In step S609, the camera control unit 201 ends the shooting process.

In step S610, the camera control unit 201 determines whether or not the main switch of the digital camera has been turned off. If the camera control unit 201 determines that the main switch has been turned off, this flow ends, and if the camera control unit 201 determines that the main switch has been not turned off, the process returns to step S601. In addition to turning off the main switch, this flow may end by determining that the camera main body 2 has switched to the playback mode for playing back the image captured by the camera main body 2 on the display unit (not illustrated).

Fifth Embodiment

Figure 11:
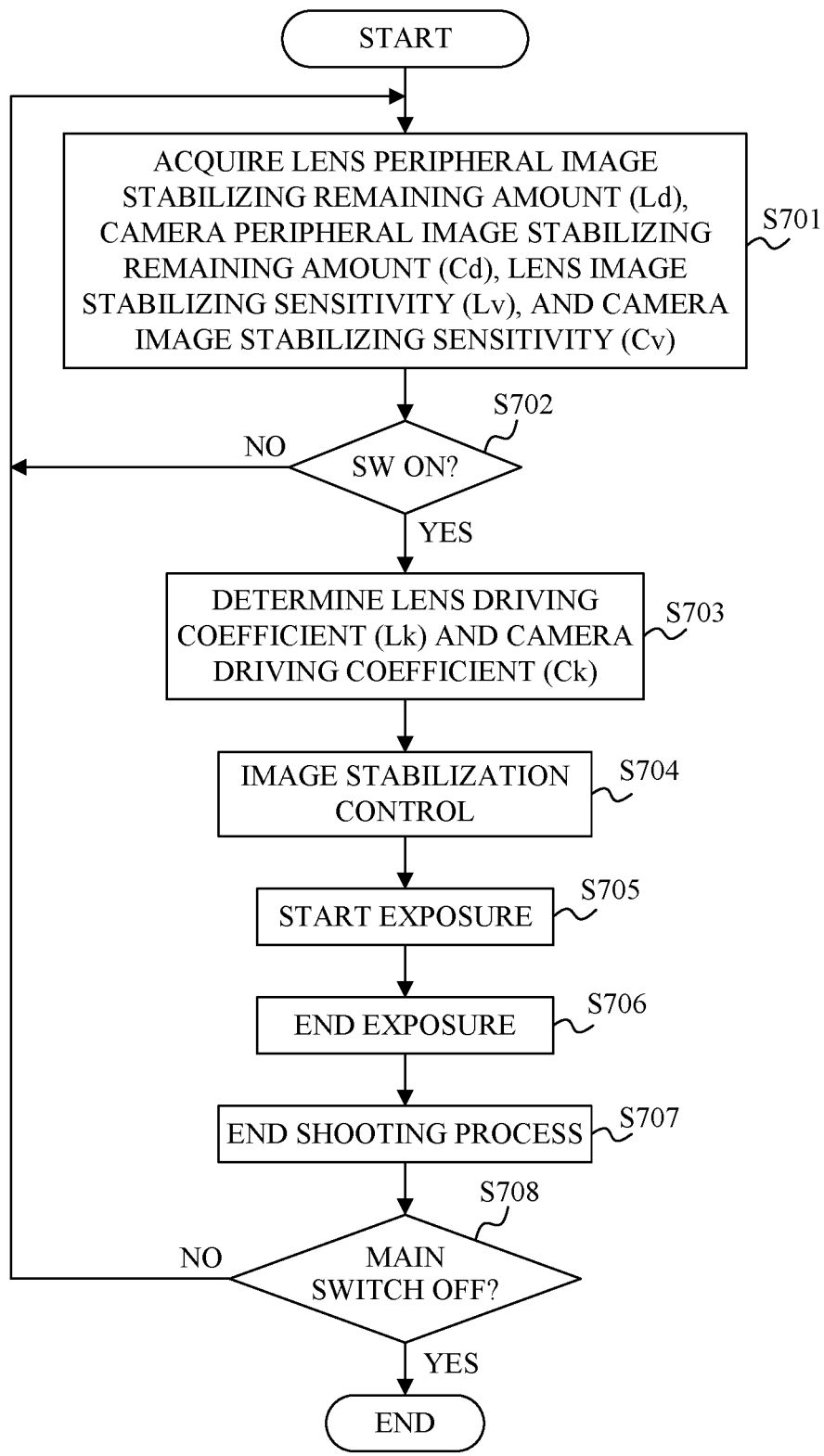
FIG. 11 is a flowchart illustrating lens stabilization executed by a digital camera according to fifth and sixth embodiments.

Image stabilization performed by a digital camera according to this embodiment determines driving amounts of two image shake correctors on the basis of the information stored in the lens storage unit 103 while the camera control unit 201 communicates with the lens control unit 104 via the electrical contact 3. FIG. 11 is a flowchart illustrating the image stabilization executed by the digital camera according to this embodiment. The flow of FIG. 11 is started when the power of the digital camera is turned on or when the sleep state is restored.

In step S701, the camera control unit 201 acquires the lens peripheral image stabilizing remaining amount Ld and the camera peripheral image stabilizing remaining amount Cd stored in the lens storage unit 103 via the electrical contact 3 and the lens control unit 104. Additionally, the camera control unit 201 acquires lens image stabilizing sensitivity Lv and camera image stabilizing sensitivity Cv.

As described above, the lens peripheral image stabilizing remaining amount Ld is the remaining amount of the image stabilization at the peripheral part in the image when the lens image shake corrector 106 corrects the image shake generated at the center part in the image by the predetermined angle, and is the remaining amount of the image stabilization at the predetermined image height in the image. The lens peripheral image stabilizing remaining amount Ld may be the coefficient of the function shows how the value of the lens peripheral image stabilizing remaining amount varies for each image height when the image shake generated at the center part in the image is corrected by the predetermined angle.

Additionally, the camera peripheral image stabilizing remaining amount Cd is the remaining amount of the image stabilization at the peripheral part in the image when the camera image shake corrector 204 corrects the image shake generated at the center part in the image by the predetermined angle, and is the remaining amount of the image stabilization at the predetermined image height in the image. The camera peripheral image stabilizing remaining amount Cd may be the coefficient of the function shows how the value of the camera peripheral image stabilizing remaining amount varies for each image height when the image shake generated at the center part in the image is corrected by the predetermined angle.

In addition, the lens image stabilizing sensitivity Lv is an image stabilizing angle when the image stabilizing optical system 102 is driven by a predetermined amount.

Furthermore, the camera image stabilization sensitivity Cv is an image stabilization angle when the image pickup element 202 is driven by a predetermined amount.

In step S702, the camera control unit 201 determines whether or not the shooting start instruction (referred to as SW) has been input. Specifically, determination is made by detecting whether or not the release button provided on the digital camera has been pressed by the photographer. If the camera control unit 201 determines that the SW has been input, the process proceeds to step S703, and if the camera control unit 201 determines that the SW has not been input, the process returns to step S701.

In step S703, the camera control unit 201 determines a lens driving coefficient Lk and a camera driving coefficient Ck on the basis of the lens peripheral image stabilizing remaining amount Ld and the camera peripheral image stabilizing remaining amount Cd. The lens driving coefficient Lk is used to acquire the angle corrected by the lens image shake corrector 106. Additionally, the camera driving coefficient Ck is used to acquire the angle corrected by the camera image shake corrector 204. The lens driving coefficient Lk and the camera driving coefficient Ck are determined using the following equations (3) and (4), respectively.

[Number 2]

$$Lk = \frac{Cd}{Cd - Ld} \quad (3)$$

$$Ck = \frac{-Ld}{Cd - Ld} \quad (4)$$

In step S704, image stabilization control is started using the lens driving coefficient Lk and the camera driving coefficient Ck determined in step S703.

When the digital camera is rotated by the angle θ, the angle Lθ corrected by the lens image shake corrector 106 and the angle CO corrected by the camera image shake corrector 204 are determined using the following equations (5) and (6), respectively.

[Number 3]

$$L\theta = \theta \cdot Lk \quad (5)$$

$$C\theta = \theta \cdot Ck \quad (6)$$

Additionally, a driving amount Lt of the lens image shake corrector 106 and a driving amount Ct of the camera image shake corrector 204 are determined using the following equations (7) and (8), respectively.

[Number 4]

$$Lt = \frac{L\theta}{Lv} \quad (7)$$

$$Ct = \frac{C\theta}{Cv} \quad (8)$$

When the digital camera is rotated by the angle θ, the lens image shake corrector 106 and the camera image shake corrector 204 are controlled by the driving amount Lt of the lens image shake corrector 106 and the driving amount Ct of the camera image shake corrector 204. The driving control started in this step continues until the exposure ends.

In step S705, the exposure starts.

In step S706, the exposure ends.

In step S707, the camera control unit 201 ends the shooting process.

In step S708, the camera control unit 201 determines whether or not the main switch of the digital camera has been turned off. If the camera control unit 201 determines that the main switch has been turned off, this flow ends, and if the camera control unit 201 determines that the main switch has been not turned off, the process returns to step S701. In addition to turning off the main switch, this flow may end by determining that the camera main body 2 has switched to the playback mode for playing back the image captured by the camera main body 2 on the display unit (not illustrated).

In this embodiment, the driving amount Lt of the lens image shake corrector 106 and the driving amount Ct of the camera image shake corrector 204 are determined so that the peripheral image stabilizing remaining amount is reduced.

For example, the peripheral image stabilizing remaining amount is 0.01 mm (=Ld) in correcting the image shake when the digital camera is rotated by 1° using the lens image shake corrector 106 to stop the center part in the image. Additionally, the peripheral image stabilizing remaining amount is 0.03 mm (=Cd) in correcting the image shake when the digital camera is rotated by 1° using the camera image shake corrector 204 to stop the center part in the image. At this time, when the digital camera is rotated by 0.5°, the lens image shake corrector 106 is driven to correct the image shake of 0.75° (=Lθ). In addition, the camera image shake corrector 204 is driven to correct the image shake of −0.25° (=Cθ).

The drive ratio is determined so that the image shake corrector with a drive method with a small peripheral shake amount is driven more, and the image shake corrector with a drive method with a large peripheral shake amount is driven in the opposite direction, thereby the peripheral shake amount can be cancelled while performing the image stabilization. As a result, it is possible to perform the image stabilization without a peripheral shake when performing the image stabilization.

A description will be given of a concept of the image stabilization.

FIG. 12A to 12c respectively illustrate an image point moving amount of the object image due to the image shake when the digital camera is rotated by co in a x direction, an image point moving amount of the object image when the lens image shake corrector is driven, and an image point moving amount of the object image when the camera image shake corrector is driven.

As illustrated shown in FIG. 12A, in the image pickup optical system adopting the central projection method, the image point moving amount generated during the image shake differs between the center part and the peripheral part. When the focal length of the image pickup optical system is f, the image height from the center part in the rotational shake direction is y, and the rotational shake amount is co, the image point moving amount Δy at the image height y is expressed by the following equation (9).

$$\Delta y = f \times \tan\left(a\tan\left(\frac{y}{f}\right) + \omega\right) - y \qquad (9)$$

Additionally, as illustrated in FIG. 12B, when the lens image shake corrector is driven, eccentric distortion occurs due to the eccentricity of some lenses of the image pickup optical system, and the image point moving amounts at the center part and the peripheral part are different.

In addition, as illustrated in FIG. 12C, when the camera image shake corrector is driven, the image pickup element is driven in the direction perpendicular to the optical axis of the image pickup optical system and thus, the image point moving amounts at the center part and the peripheral part are almost the same. However, the image point moving amounts at the center part and the peripheral part may differ due to the influence of lens distortion.

Next, referring now to FIGS. 13A to 13C, a description will be given of a concept of the image stabilization.

FIG. 13A illustrates the image point moving amount of the object image due to the image shake when the digital camera is rotated by w in the x direction similarly to FIG. 12A and illustrates the image point moving amount differs between the center part and the peripheral part.

In FIG. 13B, the lens image shake corrector is driven to correct the image shake generated in FIG. 13A. As illustrated in FIG. 12B, even with the image point correction of the lens image shake corrector, the image point moving amounts at the center part and the peripheral part are different, but the ratio of the image point moving amounts at the center part and the peripheral part is different from that of the image point moving amounts at the center part and the peripheral part due to the image shake generated when the digital camera rotates. Accordingly, it is impossible to make both the image shakes at the center part and the peripheral part completely zero only by the image stabilization by the lens image shake corrector. Thus, in FIG. 13B, the image stabilization is performed by driving the lens image shake corrector so that the image point moving amounts at the center part and the peripheral part are equal. The image point moving amount at the center part in FIG. 13B is in the opposite direction to the image point moving amount at the center part generated in FIG. 13A. That is, in FIG. 13B, driving is performed to overcompensate compared to the case where the image shake is corrected only by the lens image shake corrector.

In FIG. 13C, the image shake overcorrected in FIG. 13B is corrected by the camera image shake corrector. As illustrated in FIG. 12C, when the camera image shake corrector is driven, the image point moving amounts at the center part and the peripheral part almost match. Thus, the image shake caused by the rotation of the digital camera is corrected by the lens image shake corrector so that the image point moving amounts at the center part and the peripheral part are equal (FIG. 13B), and the remaining image shake is corrected by the camera image shake corrector (FIG. 13C). Thereby, the image shake at the center part and the peripheral part can be corrected.

In the concept explained in FIGS. 13A to 13C, the image point moving amounts at the center part and the peripheral part match when the camera image shake corrector is driven. If the image point moving amounts at the center part and the peripheral part do not match, the driving amount of the lens image shake corrector can be optimized according to the ratio of the image point moving amounts at the center part and the peripheral part when the camera image shake corrector is driven. This makes it possible to correct the final image shake of the final center part and the image shake of the peripheral part. Thereby, the final image shake at the center part can be corrected and the image shake at peripheral part can be corrected.

Next, referring now to FIGS. 14A to 14C, a description will be given of a concept of the image stabilization.

FIG. 14A illustrates the image point moving amount of the object image due to the image shake when the digital camera is rotated by w in the x direction similarly to FIG. 12A and illustrates the image point moving amount differs between the center part and the peripheral part.

In FIG. 14B, the lens image shake corrector is driven to correct the image shake generated in FIG. 14A. As illustrated in FIG. 12B, even with the image point correction of the lens image shake corrector, the image point moving amounts at the center part and the peripheral part are different, but the ratio of the image point moving amounts at the center part and the peripheral part is different from that of the image point moving amounts at the center part and the peripheral part due to the image shake generated when the digital camera rotates. Accordingly, it is impossible to make both the image shakes at the center part and the peripheral part completely zero only by the image stabilization by the lens image shake corrector. Thus, in FIG. 14B, the image stabilization is performed by driving the lens image shake corrector so that the image point moving amounts at the center part and the peripheral part are equal. The image point moving amount at the center part in FIG. 14B remains the image stabilization amount in the same direction as the image point moving amount at the center part generated in FIG. 14A. That is, in FIG. 14B, driving is performed with insufficient correction compared to the case where the image shake is corrected only by the lens image shake corrector.

In FIG. 14C, the camera image shake corrector corrects the image shake insufficiently corrected in FIG. 14B. As illustrated in FIG. 12C, when the camera image shake corrector is driven, the image point moving amounts at the center part and the peripheral part almost match. Thus, the image shake caused by the rotation of the digital camera is corrected by the lens image shake corrector so that the image point moving amounts at the center part and the peripheral part are equal (FIG. 14B), and the remaining image shake is corrected by the camera image shake corrector (FIG. 14C). Thereby, the image shake at the center part and the peripheral part can be corrected.

In the concept explained in FIGS. 14A to 14C, the image point moving amounts at the center part and the peripheral part match when the camera image shake corrector is driven. If the image point moving amounts at the center part and the peripheral part do not match, the driving amount of the lens image shake corrector can be optimized according to the ratio of the image point moving amounts at the center part and the peripheral part when the camera image shake corrector is driven. This makes it possible to correct the final image shake of the final center part and the image shake of the peripheral part. Thereby, the final image shake at the center part can be corrected and the image shake at peripheral part can be corrected.

Sixth Embodiment

Image stabilization performed by a digital camera according to this embodiment determines driving amounts of two image shake correctors on the basis of the information stored in the lens storage unit 103 while the camera control unit 201 communicates with the lens control unit 104 via the electrical contact 3. FIG. 11 is the flowchart illustrating the image stabilization executed by the digital camera according to this embodiment. The flow of FIG. 11 is started when the power of the digital camera is turned on or when the sleep state is restored.

In step S701, the camera control unit 201 acquires the lens peripheral image stabilizing remaining amount Ld and the camera peripheral image stabilizing remaining amount Cd stored in the lens storage unit 103 via the electrical contact 3 and the lens control unit 104. Additionally, the camera control unit 201 acquires the lens image stabilizing sensitivity Lv and the camera image stabilizing sensitivity Cv.

As described above, the lens peripheral image stabilizing remaining amount Ld is the remaining amount of the image stabilization at the peripheral part in the image when the lens image shake corrector 106 corrects the image shake generated at the center part in the image by the predetermined angle, and is the remaining amount of the image stabilization at the predetermined image height in the image. The lens peripheral image stabilizing remaining amount Ld may be the coefficient of the function shows how the value of the lens peripheral image stabilizing remaining amount varies for each image height when the image shake generated at the center part in the image is corrected by the predetermined angle.

Additionally, the camera peripheral image stabilizing remaining amount Cd is the remaining amount of the image stabilization at the peripheral part in the image when the camera image shake corrector 204 corrects the image shake generated at the center part in the image by the predetermined angle, and is the remaining amount of the image stabilization at the predetermined image height in the image. The camera peripheral image stabilizing remaining amount Cd may be the coefficient of the function shows how the value of the camera peripheral image stabilizing remaining amount varies for each image height when the image shake generated at the center part in the image is corrected by the predetermined angle.

In addition, the lens image stabilizing sensitivity Lv is an image stabilizing angle when the image stabilizing optical system 102 is driven by the predetermined amount.

Furthermore, the camera image stabilization sensitivity Cv is the image stabilization angle when the image pickup element 202 is driven by the predetermined amount.

In step S702, the camera control unit 201 determines whether or not the shooting start instruction (referred to as SW) has been input. Specifically, determination is made by detecting whether or not the release button provided on the digital camera has been pressed by the photographer. If the camera control unit 201 determines that the SW has been input, the process proceeds to step S703, and if the camera control unit 201 determines that the SW has not been input, the process returns to step S701.

In step S703, the camera control unit 201 determines the lens driving coefficient Lk and the camera driving coefficient Ck on the basis of the lens peripheral image stabilizing remaining amount Ld and the camera peripheral image stabilizing remaining amount Cd. The lens driving coefficient Lk is used to acquire the angle corrected by the lens image shake corrector 106. Additionally, the camera driving coefficient Ck is used to acquire the angle corrected by the camera image shake corrector 204. The lens driving coefficient Lk and the camera driving coefficient Ck are determined using the above equations (3) and (4), respectively.

In step S704, the image stabilization control is started using the lens driving coefficient Lk and the camera driving coefficient Ck determined in step S703.

Even if the remaining amount of the stabilization image at the predetermined image height is not 0, it is permissible if it is equal to or less than a permissible peripheral image shake remaining amount t.

Thus, when the digital camera is rotated by the angle θ, the lens peripheral image stabilizing remaining amount Lθ corrected by the lens image shake corrector 106 and the camera peripheral image stabilizing remaining amount CO corrected by the camera image shake corrector 204 are determined using the following equations (10) and (11), respectively.

$$L\theta = \frac{t - Cd \times \theta}{Ld - Cd} \quad (10)$$

$$C\theta = \frac{t - Ld \times \theta}{Cd - Ld} \quad (11)$$

Additionally, the driving amount Lt of the lens image shake corrector 106 and the driving amount Ct of the camera image shake corrector 204 are determined using the above equations (7) and (8), respectively.

When the digital camera is rotated by the angle θ, the lens image shake corrector 106 and the camera image shake corrector 204 are controlled by the driving amount Lt of the lens image shake corrector 106 and the driving amount Ct of the camera image shake corrector 204. The driving control started in this step continues until the exposure ends.

In step S705, the exposure starts.

In step S706, the exposure ends.

In step S707, the camera control unit 201 ends the shooting process.

In step S708, the camera control unit 201 determines whether or not the main switch of the digital camera has been turned off. If the camera control unit 201 determines that the main switch has been turned off, this flow ends, and if the camera control unit 201 determines that the main switch has been not turned off, the process returns to step S701. In addition to turning off the main switch, this flow may end by determining that the camera main body 2 has switched to the playback mode for playing back the image captured by the camera main body 2 on the display unit (not illustrated).

In this embodiment, the driving amount Lt of the lens image shake corrector 106 and the driving amount Ct of the camera image shake corrector 204 are determined so that the peripheral image stabilizing remaining amount is reduced.

The drive ratio is determined so that the image shake corrector with the drive method with the small peripheral shake amount is driven more, and the image shake corrector with the drive method with the large peripheral shake amount is driven in the opposite direction, thereby the peripheral shake amount can be cancelled while performing the image stabilization. As a result, it is possible to perform the image stabilization without the peripheral shake when performing the image stabilization.

Seventh Embodiment

Figure 15:
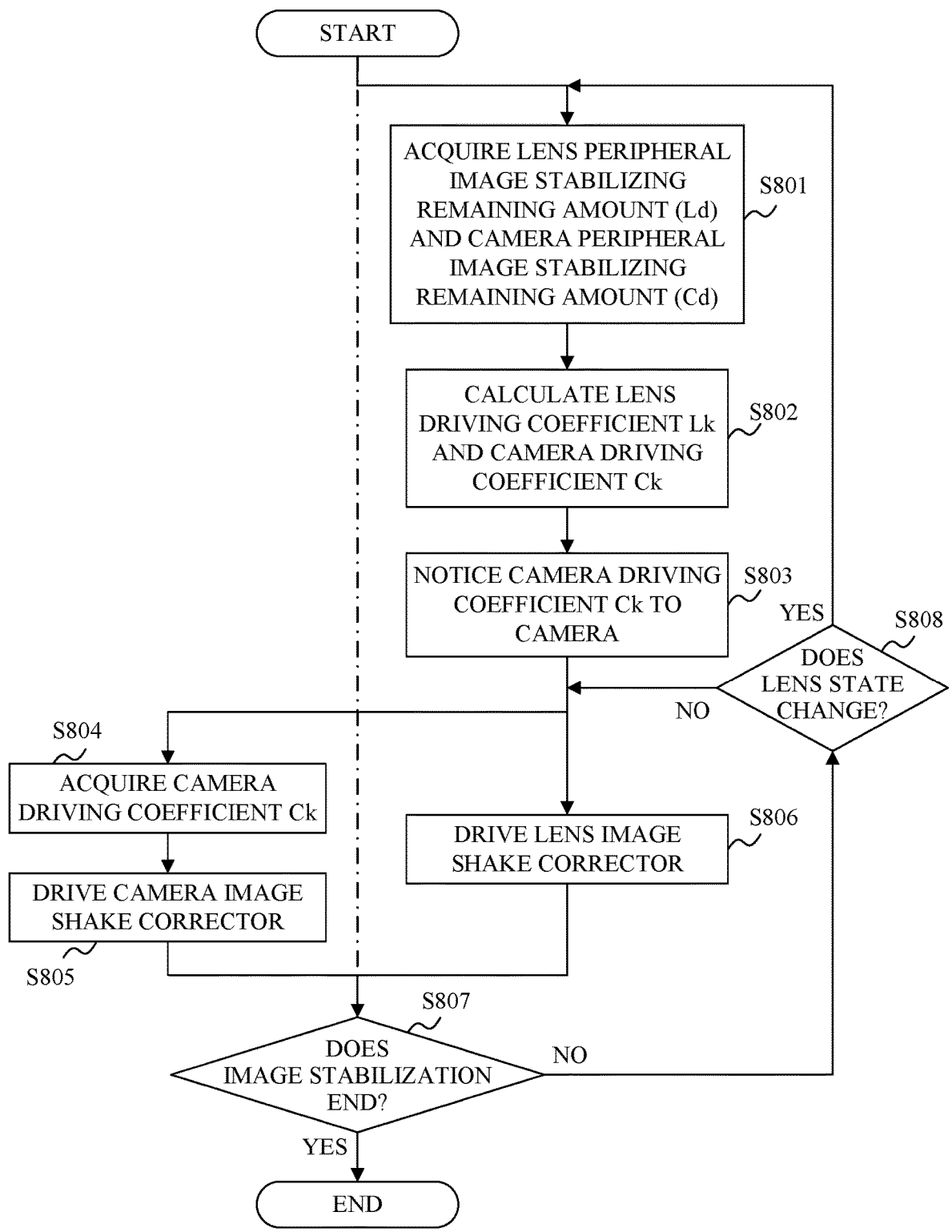
FIG. 15 is a flowchart illustrating lens stabilization executed by a digital camera according to seventh embodiment.

Image stabilization performed by a digital camera according to this embodiment determines driving amounts of two image shake correctors on the basis of the information stored in the lens storage unit 103 while the camera control unit 201 communicates with the lens control unit 104 via the electrical contact 3. FIG. 15 is the flowchart illustrating the image stabilization executed by the digital camera according to this embodiment. The flow of FIG. 15 is started when the power of the digital camera is turned on or when the sleep state is restored.

In step S801, the lens control unit 104 acquires the lens peripheral image stabilizing remaining amount Ld, the camera peripheral image stabilizing remaining amount Cd, the lens image stabilizing sensitivity Lv, and the camera image stabilizing sensitivity Cv stored in the lens storage unit 103.

As described above, the lens peripheral image stabilizing remaining amount Ld is the remaining amount of the image stabilization at the peripheral part in the image when the lens image shake corrector 106 corrects the image shake generated at the center part in the image by the predetermined angle, and is the remaining amount of the image stabilization at the predetermined image height in the image. The lens peripheral image stabilizing remaining amount Ld may be the coefficient of the function shows how the value of the lens peripheral image stabilizing remaining amount varies for each image height when the image shake generated at the center part in the image is corrected by the predetermined angle.

Additionally, the camera peripheral image stabilizing remaining amount Cd is the remaining amount of the image stabilization at the peripheral part in the image when the camera image shake corrector 204 corrects the image shake generated at the center part in the image by the predetermined angle, and is the remaining amount of the image stabilization at the predetermined image height in the image. The camera peripheral image stabilizing remaining amount Cd may be the coefficient of the function shows how the value of the camera peripheral image stabilizing remaining amount varies for each image height when the image shake generated at the center part in the image is corrected by the predetermined angle.

In addition, the lens image stabilizing sensitivity Lv is the image stabilizing angle when the image stabilizing optical system 102 is driven by the predetermined amount.

Furthermore, the camera image stabilization sensitivity Cv is the image stabilization angle when the image pickup element 202 is driven by the predetermined amount.

In step S802, the lens control unit 104 determines the lens driving coefficient Lk and the camera driving coefficient Ck on the basis of the lens peripheral image stabilizing remaining amount Ld and the camera peripheral image stabilizing remaining amount Cd. The lens driving coefficient Lk is used to acquire the angle corrected by the lens image shake corrector 106. Additionally, the camera driving coefficient Ck is used to acquire the angle corrected by the camera image shake corrector 204. The lens driving coefficient Lk and the camera driving coefficient Ck are determined using the above equations (3) and (4), respectively.

In step S803, the lens control unit 104 notices the camera driving coefficient Ck to the camera body 2 (camera control unit 201) determined in step S802.

In step S804, the camera control unit 201 acquires the camera driving coefficient Ck determined in step S802.

In step S805, the camera control unit 201 drives the camera image shake corrector 204 using the camera driving coefficient Ck.

The angle CO that the camera image shake corrector 204 corrects when the digital camera is rotated by the angle θ is determined using the equation (6).

Additionally, the driving amount Ct of the camera image shake corrector 204 is determined using the equation (8).

In step S806, the lens control unit 104 drives the lens image shake corrector 106 using the lens driving coefficient Lk determined in step S802.

The angle Lθ that the lens image shake corrector 106 corrects when the digital camera is rotated by the angle θ is determined using the equation (5).

Additionally, the driving amount Lt of the lens image shake corrector 106 is determined using the equation (7).

When the digital camera is rotated by the angle θ, the lens image shake corrector 106 and the camera image shake corrector 204 are controlled by the driving amount Lt of the lens image shake corrector 106 and the driving amount Ct of the camera image shake corrector 204.

In step S807, it is determined whether or not to end image stabilization. If it is determined to end the image stabilization, this flow ends, and if it is determined not to end the image stabilization, the process proceeds to step S808.

In step S808, it is determined whether or not the lens state has changed. The lens state is the zoom state and the focus state of the lens. If it is determined that the lens state has changed, the process proceeds to step S801, and if it is determined that the lens state has not changed, the process proceeds to step S806.

Other Embodiments

Embodiment(s) of the disclosure can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer executable instructions may be provided to the computer, for example, from a network or the storage medium. The storage medium may include, for example, one or more of a hard disk, a random-access memory (RAM), a read-only memory (ROM), a storage of distributed computing systems, an optical disk (such as a compact disc (CD), digital versatile disc (DVD), or Blu-ray Disc (BD)™), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-000017, filed on Jan. 1, 2022, and No. 2022-187009, filed on Nov. 24, 2022, which are hereby incorporated by reference herein in their entirety.

What is claimed is:

1. A control apparatus configured to control an image pickup system including a first apparatus that is one of an image pickup apparatus and a lens apparatus to be attached to the image pickup apparatus and a second apparatus that is the other of the image pickup apparatus and the lens apparatus, the control apparatus comprising:
   a processor; and
   a memory storing a program that, when executed by the processor, causes the processor to function as:
      an acquisition unit configured to acquire first information about a first image stabilizing remaining amount at an off-axis image height in an image according to correction by a first image shake corrector provided in the first apparatus and second information about a second image stabilizing remaining amount at the off-axis image height according to correction by a second image shake corrector provided in the second apparatus; and
      a control unit configured to control at least one of the first image shake corrector and the second image shake corrector on the basis of correction ratios of the first image shake corrector and the second image shake corrector determined using the first information and the second information.

2. The control apparatus according to claim 1, wherein when the first image stabilizing remaining amount is smaller than the second image stabilizing remaining amount, the control unit controls the first image shake corrector.

3. The control apparatus according to claim 1, wherein when the first image stabilizing remaining amount is smaller than the second image stabilizing remaining amount and a shake amount applied to the first apparatus is equal to or less than a threshold value, the control unit controls the first image shake corrector on the basis of the shake amount, and wherein when the first image stabilizing remaining amount is smaller than the second image stabilizing remaining amount and the shake amount is larger than the threshold value, the control unit controls the first image shake corrector and the second image shake corrector on the basis of the shake amount.

4. The control apparatus according to claim 3, wherein when the first image stabilizing remaining amount is smaller than the second image stabilizing remaining amount and the shake amount is larger than the threshold value, the control unit controls the first image shake corrector to correct an image shake amount corresponding to the threshold value, and controls the second image shake corrector to correct an image shake amount corresponding to a difference between the shake amount and the image shake amount corresponding to the threshold value.

5. The control apparatus according to claim 3, wherein when the first image stabilizing remaining amount is smaller than the second image stabilizing remaining amount and the shake amount is larger than the threshold value, the control unit determines the correction ratios so that the first image shake corrector and the second image shake corrector correct an image shake amount smaller than an image shake amount corresponding to the threshold value.

6. The control apparatus according to claim 1,
   wherein the first image stabilizing remaining amount is a remaining amount of image stabilization at the off-axis image height when the first image shake corrector corrects an image shake generated at a center part in the image, and
   wherein the second image stabilizing remaining amount is a remaining amount of image stabilization at the off-axis image height when the second image shake corrector corrects the image shake generated at the center part.

7. The control apparatus according to claim 1, wherein the first information includes first image stabilizing remaining amounts corresponding to each of a plurality of off-axis image heights.

8. The control apparatus according to claim 1, wherein the second information includes second image stabilizing remaining amounts corresponding to each of a plurality of off-axis image heights.

9. The control apparatus according to claim 1, wherein the first information includes a coefficient on the first image stabilizing remaining amount.

10. The control apparatus according to claim 1, wherein the second information includes a coefficient on the second image stabilizing remaining amount.

11. The control apparatus according to claim 1, wherein when the first image stabilizing remaining amount and the second image stabilizing remaining amount have the same sign and the first image stabilizing remaining amount is smaller than the second image stabilizing remaining amount, the control unit drives the first image shake corrector in a direction to perform image stabilization and drives the second image shake corrector in a direction opposite to the direction to perform image stabilization.

12. The control apparatus according to claim 1, wherein the control unit controls at least one of the first image shake corrector and the second image shake corrector so that an image stabilizing remaining amount in the image becomes smaller than a predetermined amount.

13. The control apparatus according to claim 1, wherein the control unit controls the first image shake corrector so that a difference between an image stabilizing remaining amount at a center part in the image and an image stabilizing remaining amount at the off-axis image height in the image becomes smaller and controls the second image shake corrector to correct an image stabilizing remaining amount according to the correction by the first image shake corrector.

14. The control apparatus according to claim 13, wherein a direction of an image shake generated at the center part and the off-axis image height is in an opposite direction to a direction of an image stabilizing remaining amount at the center part and the off-axis image height according to the correction by the first image shake corrector.

15. The control apparatus according to claim 13, wherein a direction of an image shake generated at the center part and the off-axis image height is in the same direction as a direction of an image stabilizing remaining amount at the center part and the off-axis image height according to the correction by the first image shake corrector.

16. The control apparatus according to claim 1, wherein the control unit controls the first image shake corrector so that an image stabilizing remaining amount at a center part in the image is equal to an image stabilizing remaining amount at the off-axis image height in the image and controls the second image shake corrector to correct an image stabilizing remaining amount according to the correction by the first image shake corrector.

* * * * *